United States Patent
Cho et al.

(10) Patent No.: US 10,694,383 B2
(45) Date of Patent: Jun. 23, 2020

(54) METHOD AND DEVICE FOR TRANSMITTING OR RECEIVING DATA BY TERMINAL IN WIRELESS COMMUNICATION SYSTEM

(71) Applicant: LG ELECTRONICS INC., Seoul (KR)

(72) Inventors: Heejeong Cho, Seoul (KR); Genebeck Hahn, Seoul (KR); Eunjong Lee, Seoul (KR); Ilmu Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 238 days.

(21) Appl. No.: 15/559,378

(22) PCT Filed: Aug. 21, 2015

(86) PCT No.: PCT/KR2015/008782
§ 371 (c)(1),
(2) Date: Sep. 18, 2017

(87) PCT Pub. No.: WO2016/153130
PCT Pub. Date: Sep. 29, 2016

(65) Prior Publication Data
US 2018/0070237 A1    Mar. 8, 2018

Related U.S. Application Data

(60) Provisional application No. 62/137,161, filed on Mar. 23, 2015.

(51) Int. Cl.
*H04W 12/00*    (2009.01)
*H04W 12/02*    (2009.01)
(Continued)

(52) U.S. Cl.
CPC ......... *H04W 12/08* (2013.01); *H04L 63/0428* (2013.01); *H04L 63/126* (2013.01);
(Continued)

(58) Field of Classification Search
CPC ....... H04L 29/06; H04L 9/32; H04L 63/0428; H04L 63/126; H04W 12/08; H04W 12/10;
(Continued)

(56) References Cited

U.S. PATENT DOCUMENTS

| | | | | |
|---|---|---|---|---|
| 6,819,930 | B1 * | 11/2004 | Laroia | H04W 72/14 370/329 |
| 8,238,931 | B1 * | 8/2012 | Sarkar | H04W 48/08 455/453 |
| 9,532,278 | B2 * | 12/2016 | Park | H04W 36/0055 |
| 2002/0080750 | A1 * | 6/2002 | Belcea | H04W 40/08 370/337 |

(Continued)

FOREIGN PATENT DOCUMENTS

| KR | 20030040558 A | 5/2003 |
|---|---|---|
| KR | 20120085245 A | 7/2012 |
| KR | 20150000808 A | 1/2015 |

OTHER PUBLICATIONS

SK TELECOM, '5G Core Network', S1-150083, Jan. 23, 2015. 3GPP TSG SA1 Meeting #69 Sanya, China, pp. 4-5.

*Primary Examiner* — Jayesh M Jhaveri
(74) *Attorney, Agent, or Firm* — Dentons US LLP

(57) ABSTRACT

A method and apparatus for transmitting and receiving data in a wireless communication system that supports a low latency service are provided. A terminal may transmit a request message for requesting transmission of low latency service data in an idle state to a base station, determine effectiveness (integrity) of the terminal, and receive a response message including resource information related to transmission and reception of the low latency service data from the base station in response to the request message to transmit and receive the low latency service data.

16 Claims, 24 Drawing Sheets

(51) Int. Cl.
*H04W 12/08* (2009.01)
*H04W 12/10* (2009.01)
*H04W 28/02* (2009.01)
*H04W 48/08* (2009.01)
*H04L 29/06* (2006.01)
*H04W 72/04* (2009.01)
*H04W 74/08* (2009.01)
*H04W 88/08* (2009.01)

(52) U.S. Cl.
CPC ........... *H04W 12/02* (2013.01); *H04W 12/10* (2013.01); *H04W 28/02* (2013.01); *H04W 48/08* (2013.01); *H04W 72/048* (2013.01); *H04W 74/0833* (2013.01); *H04W 88/08* (2013.01)

(58) Field of Classification Search
CPC ..... H04W 28/02; H04W 48/08; H04W 12/00; H04W 12/02
See application file for complete search history.

(56) References Cited

U.S. PATENT DOCUMENTS

| | | | |
|---|---|---|---|
| 2013/0272132 A1* | 10/2013 | Heo | H04W 72/085 370/236.2 |
| 2014/0036685 A1* | 2/2014 | Kim | H04W 48/20 370/236 |
| 2014/0199982 A1 | 7/2014 | Hahn et al. | |
| 2016/0066316 A1* | 3/2016 | Bhushan | H04W 72/0446 370/329 |

* cited by examiner

METHOD AND DEVICE FOR TRANSMITTING OR RECEIVING DATA BY TERMINAL IN WIRELESS COMMUNICATION SYSTEM

CROSS-REFERENCE TO RELATED APPLICATIONS

This application is the National Phase of PCT International Application No. PCT/KR2015/008782, filed on Aug. 21, 2015, which claims priorities under 35 U.S.C. 119(e) to U.S. Provisional Application No. 62/137,161, filed on Mar. 23, 2015, which are hereby incorporated by reference herein in their entirety.

TECHNICAL FIELD

The present invention relates to a method of transmitting and receiving data of a terminal in a wireless communication system, and more particularly, to a method in which a terminal transmits and receives data for providing a low latency service in an idle state and an apparatus that supports the same.

BACKGROUND ART

Mobile communication systems have emerged to provide a voice service while guaranteeing mobility of a user. The mobile communication system of today has been expanded to support data services in addition to the voice service. Due to the explosive increase of today's traffic, resources are running short; more and more users are demanding higher speed services; and a more advanced mobile communication system is required accordingly.

Key requirements for a next-generation mobile communication system include accommodation of explosive data traffic, significant increase of transmission rate per user, accommodation of a significantly increased number of connected devices, very low end-to-end latency, and high energy efficiency. In order to meet the requirements, various technologies such as dual connectivity, massive Multiple Input Multiple Output (MIMO), in-band full duplex, Non-Orthogonal Multiple Access (NOMA), super wideband, and device networking are being studied.

DISCLOSURE

Technical Problem

The present invention provides a method of transmitting and receiving data of a terminal in an idle state in a wireless communication system.

The present invention further provides a method of transmitting and receiving data without a change to a connected state when urgent data occur in which a terminal in an idle state should transmit and receive in a wireless communication system.

The present invention further provides a data transmitting and receiving method in which a terminal in an idle state provides a low latency service without a change to a connected state in a wireless communication system.

The present invention further provides a method of transmitting and receiving data before a terminal in an idle state determines integrity (or effectiveness) thereof in a wireless communication system.

The present invention further provides a method of extending a release time point of an allocated resource when additional data occur while a terminal in an idle state transmits and receives data in a wireless communication system.

The technical problem of this specification is not limited to the above-described technical problems and the other technical problems will be understood by those skilled in the art from the following description.

Technical Solution

The present invention has been made in view of the above problems and provides a method and apparatus for transmitting and receiving data in a wireless communication system.

In accordance with an aspect of the present invention, a method of transmitting and receiving data in a wireless communication system that supports a low latency service includes: receiving system information from a base station; performing a random access procedure with the base station based on the system information; transmitting a request message requesting transmission or reception of low latency service data to the base station through a resource allocated from the random access procedure; receiving a response message including resource information related to transmission or reception of the low latency service data in response to the request message; and transmitting and receiving a transmission message including the low latency service data based on the response message to and from the base station, wherein the method is performed in an idle state of the terminal.

Further, in the present invention, the system information may include at least one of a support field indicating whether the base station supports transmission and reception of the low latency service data in an idle state of the terminal and a security algorithm field indicating security algorithm in supported by the base station.

Further, in the present invention, the security algorithm field may include at least one of encryption algorithm for encrypting the transmission message supported by the base station or an integrity algorithm for determining whether the transmission message is changed.

Further, in the present invention, the request message may include at least one of an UE ID IE field indicating the terminal and a Tx indicator field indicating one of transmission, reception, or transmission and reception of the data.

Further, in the present invention, when the Tx indicator indicates transmission of the low latency service data, the transmitting and receiving step transmits the transmission message to the base station, and the request message may further include at least one of a security information element for determining effectiveness of the terminal or a Quality of Service Information Element (QoS IE) field indicating a characteristic of the data.

Further, in the present invention, the security information element may include at least one of a security header type field indicating whether the transmission message is encrypted or whether integrity protection for determining whether the transmission message is changed is applied or an authentication code for determining whether to change the low latency service data.

Further, in the present invention, the QoS IE field may include at least one of an EPS Bearer ID indicating a session identifier of the low latency service data or a data size field indicating a size of the data.

Further, in the present invention, the response message may include resource allocation information indicating a resource for transmission of the low latency service data and a target UE ID IE field indicating a terminal to which the resource is allocated.

Further, in the present invention, when the Tx indicator indicates reception of the low latency data, the method may further include receiving a paging message for reception of the low latency data from the base station, wherein the paging message may include at least one of a data transmission condition field indicating a reception condition of the low latency data or a receiving terminal ID field indicating a terminal receiving the paging message.

In accordance with another aspect of the present invention, a method for transmitting and receiving data in a wireless communication system supporting a low latency service includes: receiving system information from a terminal; performing a random access procedure with the terminal based on the system information; receiving a request message requesting transmission or reception of the low latency service data from the terminal through a resource allocated from the random access procedure; transmitting a response message including resource information related to transmission or reception of the low latency service data in response to the request message; and transmitting and receiving a transmission message including the low latency service data based on the response message, wherein the method is performed in an idle state of the terminal.

Further, in the present invention, the system information may include at least one of a support field indicating whether the base station supports transmission and reception of the low latency service data in an idle state of the terminal and a security algorithm field indicating security algorithm supported by the base station.

Further, in the present invention, the security algorithm field may include at least one of encryption algorithm for encrypting the transmission message supported by the base station or integrity algorithm for determining whether the transmission message is changed.

Further, in the present invention, the request message may include at least one of an UE ID IE field indicating the terminal and a Tx indicator field indicating one of transmission and reception of the data.

Further, in the present invention, when the Tx indicator indicates transmission of the data, the transmitting and receiving step receive the transmission message from the terminal, wherein the request message may further include at least one of a security information element for determining effectiveness of the terminal or a Quality of Service Information Element (QoS IE) field indicating a characteristic of the data.

Further, in the present invention, the security information element may include at least one of a security header type field indicating whether the low latency service data is encrypted or whether integrity protection for determining whether a the low latency service data is changed is applied or an authentication code for determining whether to change the low latency service data.

Further, in the present invention, the method may further include: transmitting a data transmission request message for transmitting a data transmission request of the terminal to a Mobility Management Entity (MME); and receiving a data transmission response message from the MME in response to the data transmission request message, wherein the QoS IE field may include at least one of an EPS Bearer ID indicating a session identifier of the low latency service data or a data size field indicating a size of the data, the data transmission request message may include at least one of the UE ID IE field and the security information element, and the data transmission response message may include at least one of security information including information related to encryption or integrity of the transmission message or data information including information related to transmission of the low latency service data.

Further, in the present invention, the response message may include resource allocation information indicating a resource for data transmission the data and a target UE ID IE field indicating a terminal to which the resource is an allocated.

Further, in the present invention, when the Tx indicator indicates data reception, the method may further include: transmitting a paging message for receiving of the low latency service data to the terminal; and receiving a data transmission request message for the low latency service data transmission from a Mobility Management Entity (MME), wherein the paging message may include at least one of a data transmission condition field indicating a reception condition of the low latency service data and a receiving terminal ID field indicating a terminal to receive the paging message, and the paging message may include at least one of message security information including information related to encryption or integrity of the transmission message or data information including information related to transmission of the data.

In accordance with another aspect of the present invention, a terminal for transmitting and receiving data in a wireless communication system supporting a low latency service includes: a communication unit that transmits and receives a radio signal to and from the outside; and a processor functionally coupled to the communication unit, wherein the processor controls to receive system information from a base station, to perform a random access procedure with the base station based on the system information, to transmit a request message requesting transmission or reception of low latency service data to the base station through a resource allocated from the random access procedure, to receive a response message including resource information related to transmission or reception of the low latency service data in response to the request message, and to transmit and receive a transmission message including the low latency service data based on the response message to and from the base station, wherein the method is performed in an idle state of the terminal.

In accordance with another aspect of the present invention, a base station for transmitting and receiving data in a wireless communication system supporting a low latency service includes: a communication unit that transmits and receives a radio signal to and from the outside; and a processor functionally coupled to the communication unit, wherein the processor controls to receive system information from a terminal, to perform a random access procedure with the terminal based on the system information, to receive a request message requesting transmission or reception of the low latency service data from the terminal through a resource allocated from the random access procedure, to transmit a response message including resource information related to transmission or reception of the low latency service data in response to the request message, and to transmit and receive a transmission message including the low latency service data based on the response message, wherein the method is performed in an idle state of the terminal.

Advantageous Effects

According to the present invention, a terminal that supports a low latency service can transmit and receive data in an idle state.

Further, according to the present invention, when urgent data occur in an idle state, a terminal that supports a low latency service can transmit and receive the urgent data.

Further, according to the present invention, a terminal that supports a low latency service can transmit and receive data for providing a low latency service without a change from an idle state to a connected state.

Further, according to the present invention, a terminal that supports a low latency service can transmit and receive data after determining integrity (or effectiveness) thereof in an idle state.

Further, according to the present invention, a terminal that supports a low latency service can transmit and receive additional data by extending a release time point of an allocated resource when additional data occur while transmitting and receiving data in an idle state.

The effect of this specification is not limited to the above-described effects and the other effects will be understood by those skilled in the art from the following description.

BEST MODE

Figure 1:
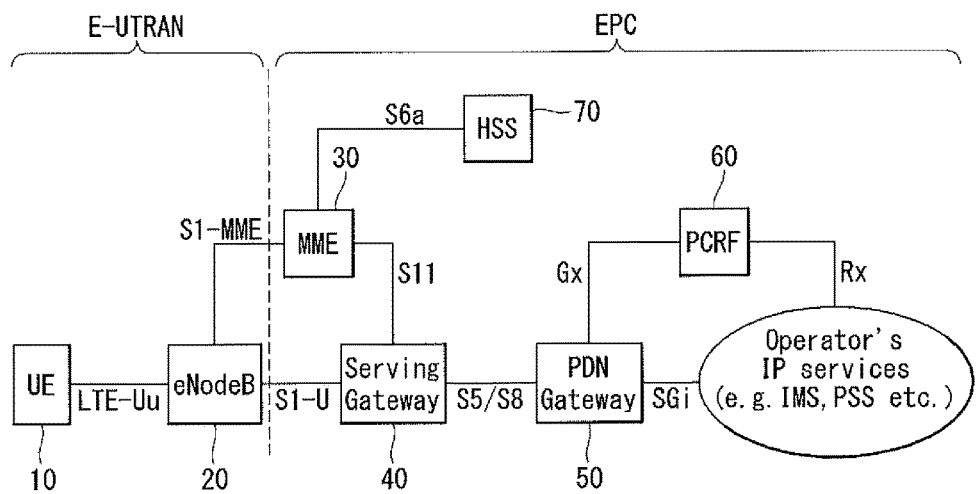
FIG. 1 illustrates an Evolved Packet System which is associated with the Long Term Evolution (LTE) system to which the present invention can be applied.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, a message, frame, a signal, field and a apparatus are not limited to each of the names as for the purpose of explaining the invention, and may be replaced with a other message, other frame, a other signal, other field and a other apparatus that performs the same function.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', 'MeNB(Macro eNB)', 'SeNB (Secondary eNB)' etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

Further, a 'terminal' may be fixed or may have mobility and may be replaced with a term such as a User Equipment (UE), Mobile Station (MS), user terminal (UT), Mobile Subscriber Station (MSS), Subscriber Station (SS), Advanced Mobile Station (AMS), Wireless terminal (WT), Machine-Type Communication (MTC) device, Machine-to-Machine (M2M) device, and Device-to-Device (D2D) device.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

FIG. 1 illustrates an Evolved Packet System which is associated with the Long Term Evolution (LTE) system to which the present invention can be applied.

The LTE system aims to provide seamless Internet Protocol (IP) connectivity between a user equipment (UE, 10) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station (20), it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 40, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

In the present invention, the MME 30 corresponds to an entity in which a function necessary to process authentication of the UE and context information is implemented, where the MME 30 is described as one embodiment of the entity. Therefore, other devices in addition to the MME 30 can also carry out the corresponding function.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

In the present invention, the S-GW 40 corresponds to an entity in which a function necessary for processing authentication of the UE and context information is implemented, where the S-GW 40 is described as one embodiment of the entity. Therefore, other devices in addition to the S-GW 40 can also carry out the corresponding function.

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

In the present invention, the P-GW 50 corresponds to an entity in which a function necessary for processing routing/forwarding of user data is implemented, where the P-GW 50 is described as one embodiment of the entity. Therefore, other devices in addition to the P-GW 50 can also carry out the corresponding function.

The PCRF 60 performs policy control decision-making and performs flow-based charging.

The HSS 70 is also referred to as a Home Location Register (HLR) and includes SAE subscription data including information about access control for roaming and an EPS-subscribed QoS profile. Further, the HSS 70 also includes information about a PDN to which the user accesses. Such information may be maintained in an Access Point Name (APN) form, and the APN is an identification technique that describes a PDN address representing an access point of the PDN or a subscribed IP address with a Domain Name system (DNS)-based label.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE. When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

Figure 2:
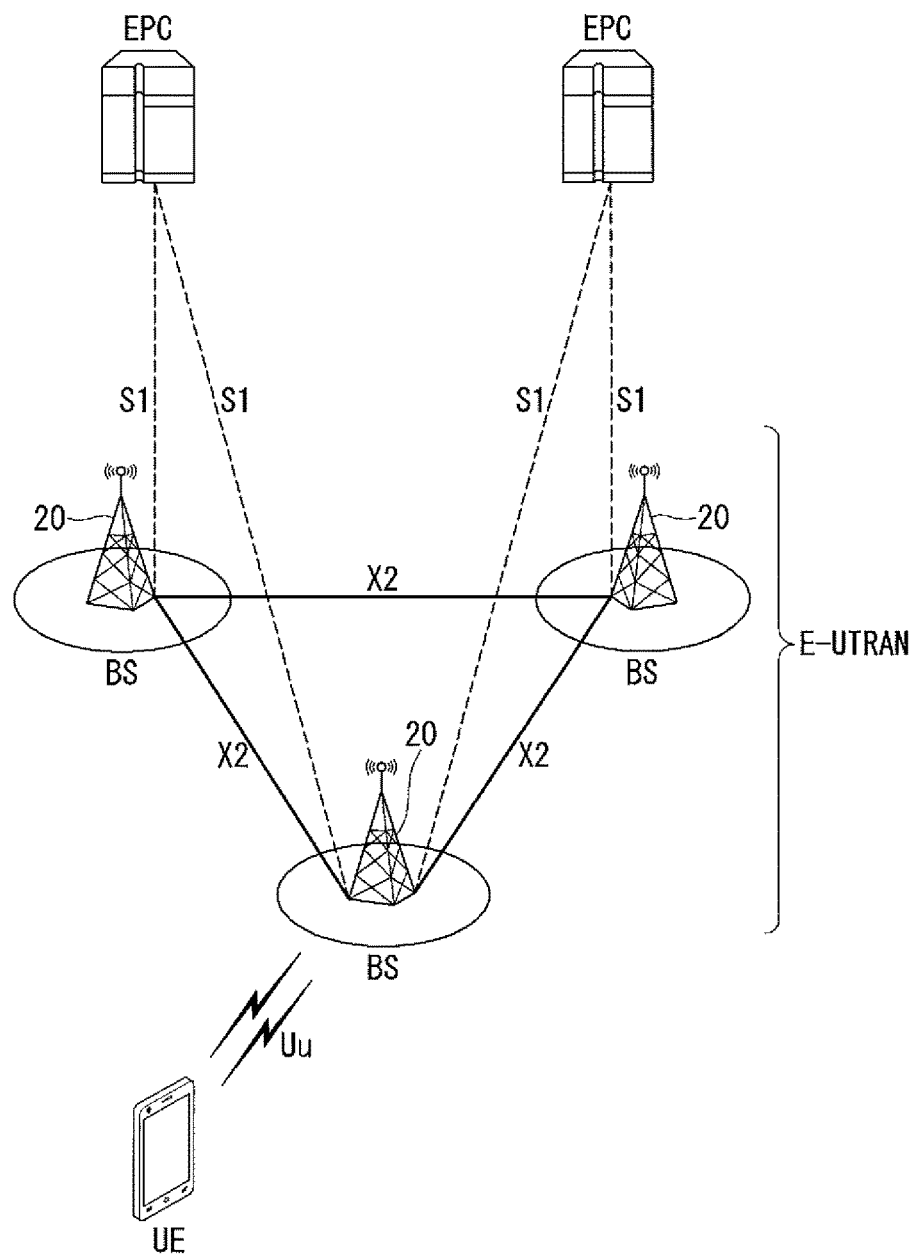
FIG. 2 illustrates a wireless communication system to which the present invention is applied.

FIG. 2 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10.

The BSs 20 are interconnected by means of an X2 interface. The BSs 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
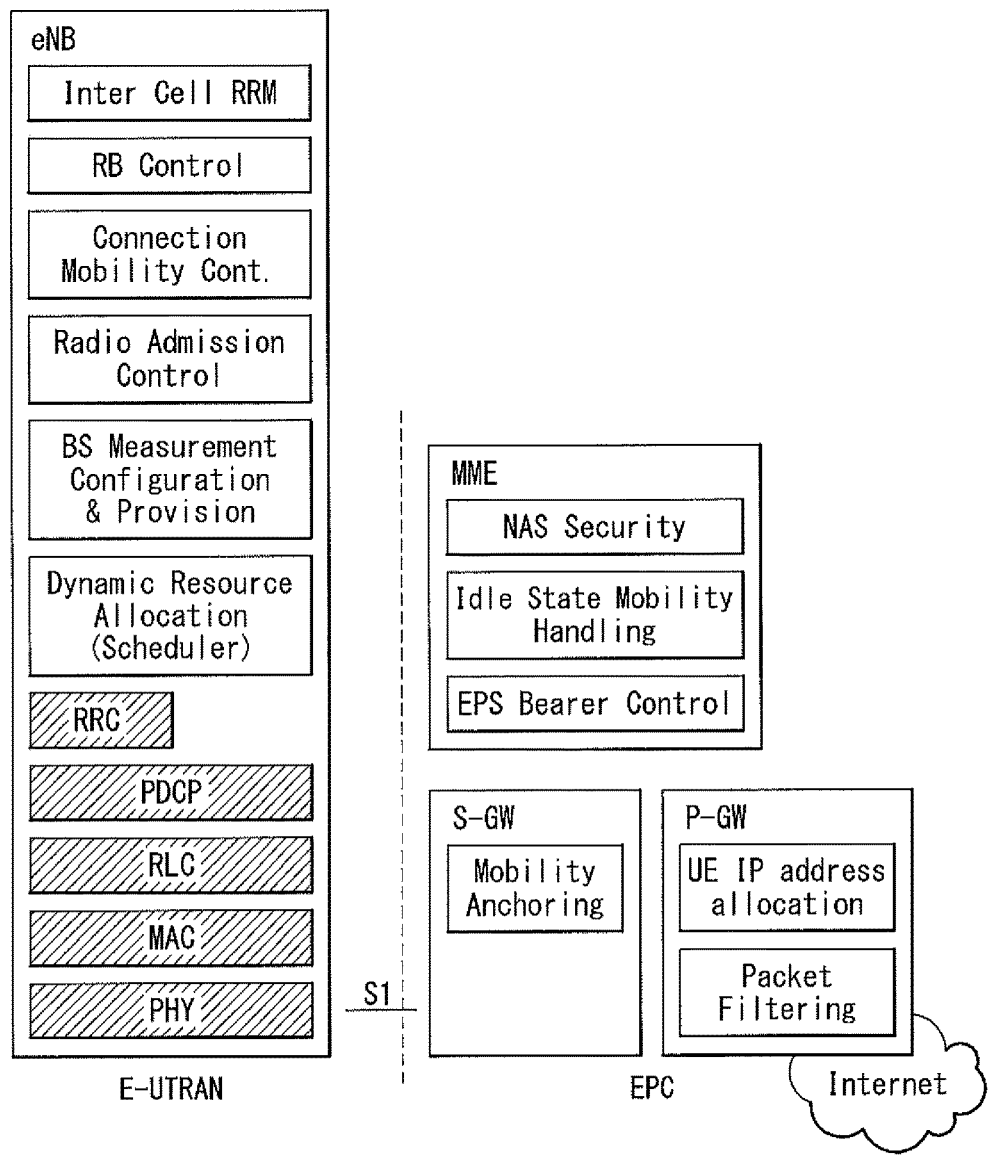
FIG. 3 illustrates a functional split of an E-UTRAN and an EPC to which the present invention can be applied.

FIG. 3 illustrates a functional split of an E-UTRAN and an EPC to which the present invention can be applied.

Referring to FIG. 3, a slashed block represents a radio protocol layer, and an empty block represents a functional entity of a control plane.

The base station performs the following functions. (1) a Radio Resource Management (RRM) function such as Radio Bearer Control, Radio Admission Control, Connection Mobility Control, and dynamic resource allocation to the terminal, (2) Internet Protocol (IP) header compression and encryption of user data stream, (3) routing of user plane data to S-GW, (4) scheduling and transmission of a paging message, (5) scheduling and transmission of broadcast information, and (6) measurement and measurement report setup for mobility and scheduling.

The MME performs the following functions. (1) Distribution of a paging message to base stations, (2) Security Control, (3) Idle State Mobility Control, (4) SAE bearer control, and (5) Integrity Protection and Ciphering of Non-Access Stratum (NAS) signaling.

The S-GW performs the following functions. (1) Termination of a user plane packet of paging, and (2) user plane switching for supporting terminal mobility.

Figure 4:
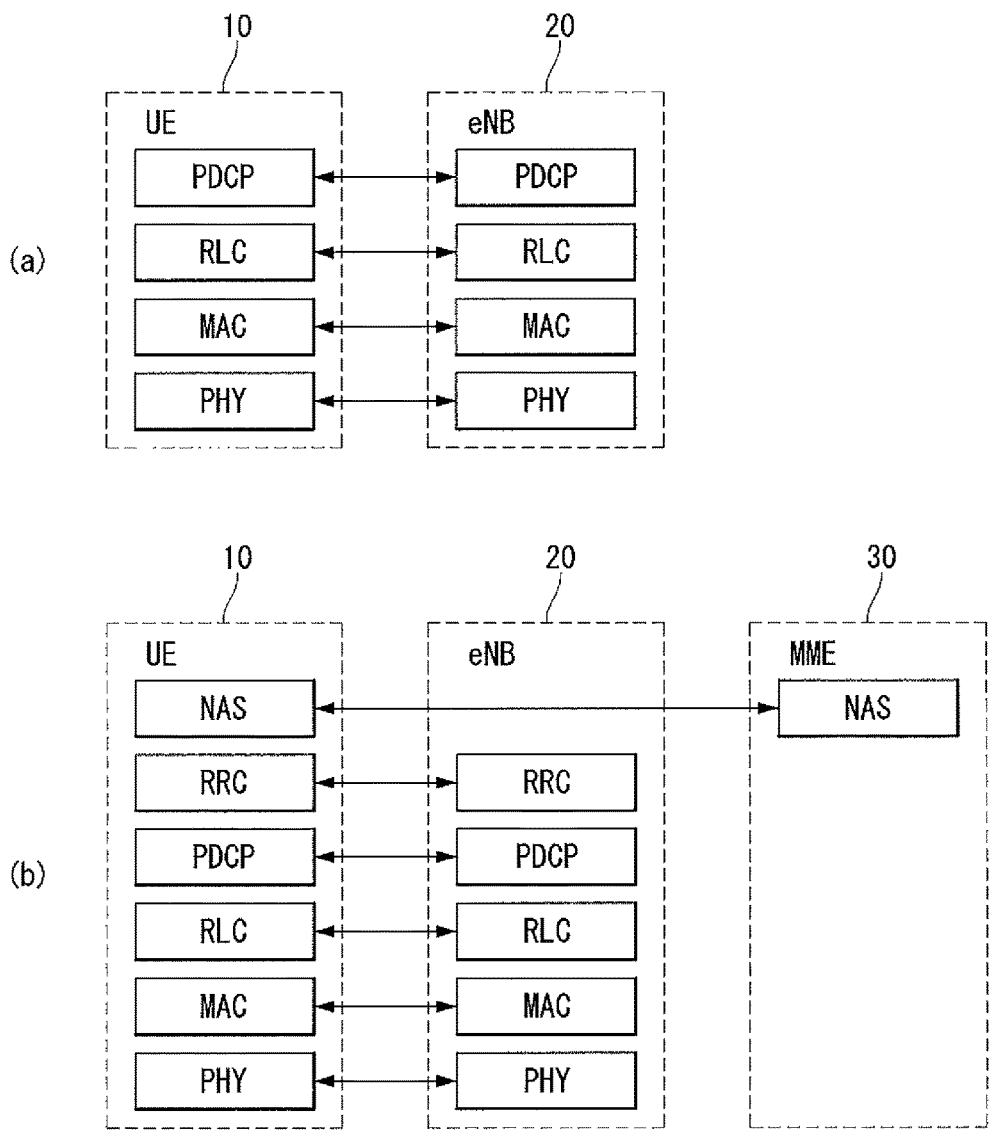
FIG. 4 is a block diagram illustrating an example of a radio protocol architecture to which a technical characteristic of the present invention may be applied.

FIG. 4 is a block diagram illustrating an example of a radio protocol architecture to which a technical characteristic of the present invention may be applied.

FIG. 4(*a*) is a block diagram illustrating an example of a radio protocol architecture of a user plane, and FIG. 4(*b*) is a block diagram illustrating an example of a radio protocol architecture of a control plane.

The user plane is a protocol stack for transmitting user data, and the control plane is a protocol stack for transmitting a control signal.

Referring to FIGS. 4(*a*) and 4(*b*), a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Figure 5:
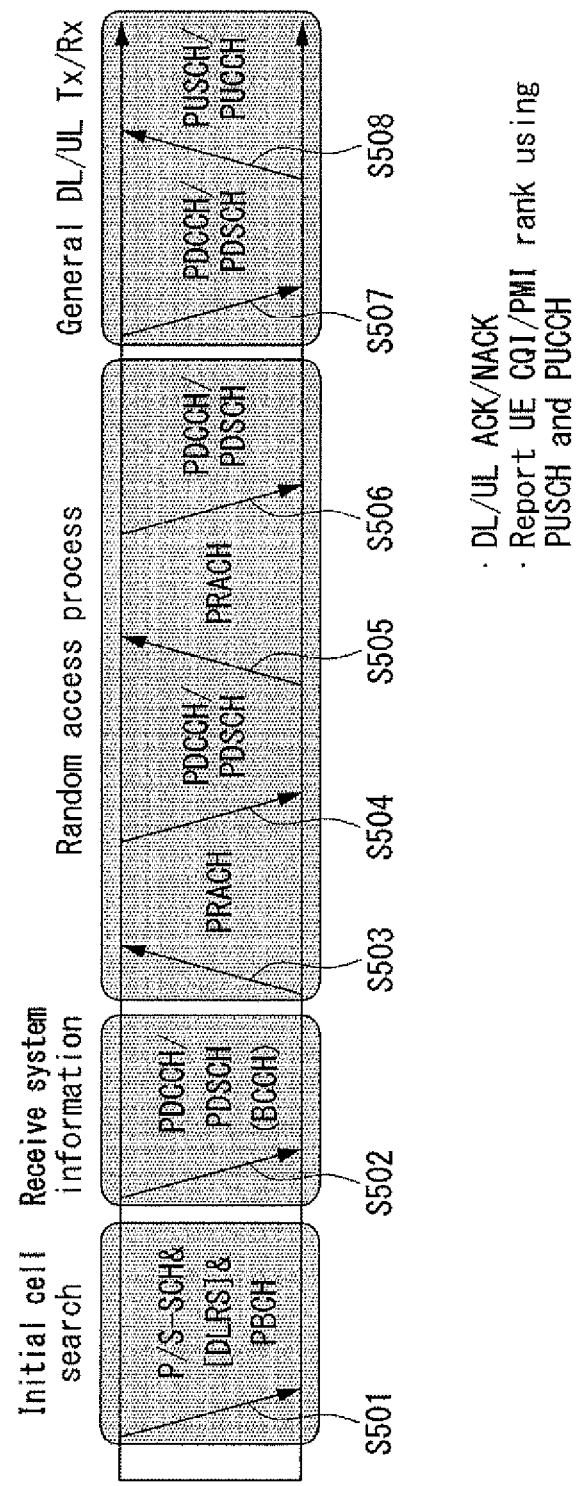
FIG. 5 illustrates physical channels used for the 3GPP LTE/LTE-A system to which the present invention can be applied and a general signal transmission method using the physical channels.

FIG. 5 illustrates physical channels used for the 3GPP LTE/LTE-A system to which the present invention can be applied and a general signal transmission method using the physical channels.

A UE, which may have been powered on again from the power-off state or may have newly entered a cell, carries out the initial cell search task such as synchronizing itself with an eNB in the S501 step. To this purpose, the UE synchronizes with the eNB by receiving a primary synchronization channel (P-SCH) and a secondary synchronization channel (S-SCH) from the eNB and obtains information such as a cell ID (identifier).

Afterwards, the UE receives a physical broadcast channel (PBCH) signal from the eNB and obtains broadcast signal within the eNB. Meanwhile, the UE receives a downlink reference signal (DL RS) in the initial cell search step to check the downlink channel status.

The UE which has finished the initial cell search receives a PDSCH according to the PDCCH and PDCCH information in the S502 step to obtain more specific system information.

Next, the UE may carry out a random access procedure such as the steps of S503 to S506 to complete a connection process to the eNB. To this purpose, the UE transmits a preamble S503 through a physical random access channel (PRACH) and receives a response message in response to the preamble through a PDSCH corresponding to the PRACH S304. In the case of contention-based random access, the UE may carry out a contention resolution procedure including transmission of an additional PRACH signal S305 and reception of a PDCCH signal and the PDSCH signal corresponding to the PDCCH signal S506.

Afterwards, the UE which has carried out the procedure above may carry out reception S507 of the PDCCH signal and/or PDSCH signal and transmission S508 of a PUSCH signal and/or a PUCCH signal as a conventional uplink/downlink signal transmission procedure.

The control information that the UE transmits to the eNB is called collectively uplink control information (UCI). The UCI includes HARQ-ACK/NACK, a scheduling request (SR), a channel quality indicator (CQI), a precoding matrix indicator (PMI), and rank indication (RI) information.

In the LTE/LTE-A system, the UCI is transmitted periodically through the PUCCH; the UCI can be transmitted through the PUSCH if control information and traffic data have to be transmitted at the same time. Also, the UCI can be transmitted non-periodically through the PUSCH according to a request or a command from the network.

Figure 6:
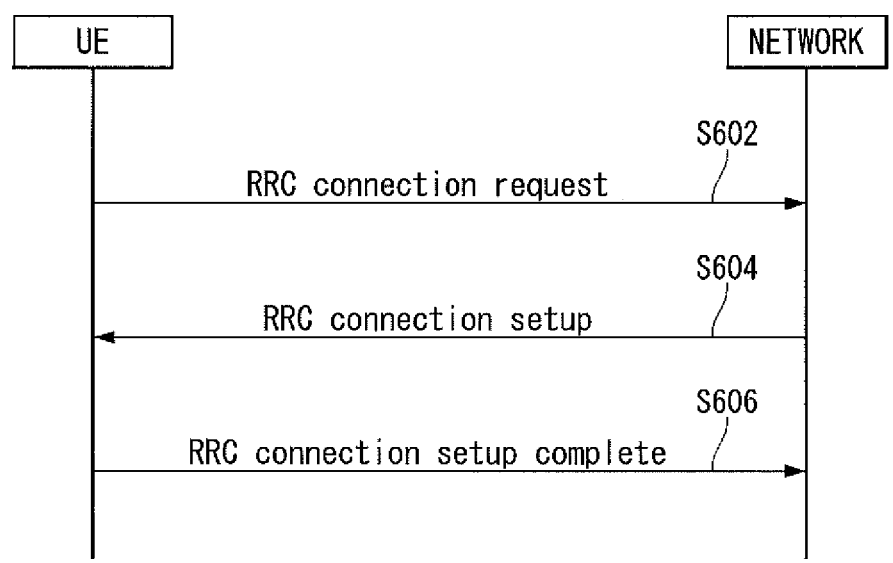
FIG. 6 is a flowchart illustrating a process of establishing an RRC connection to which the present invention may be applied.

FIG. 6 is a flowchart illustrating a process of establishing an RRC connection to which the present invention may be applied.

An RRC state represents whether an RRC layer of the UE is logically connected to an RRC layer of the E-UTRAN, and a state in which an RRC layer of the UE is logically connected to an RRC layer of the E-UTRAN is referred to as an RRC connected state, and a state in which an RRC layer of the UE is not logically connected to an RRC layer of the E-UTRAN is referred to as an RRC idle state. In the UE of an RRC connected state, because an RRC connection exists, the E-UTRAN may determine in a cell unit whether a corresponding UE exists, thereby effectively controlling the UE.

However, the E-UTRAN may not determine the UE in an RRC idle state, but a core network (CN) manages the UE in an RRC idle state in a tracking area unit, which is an area unit larger than a cell. That is, it is determined only whether the UE in an RRC idle state exists in a large area unit, and in order to receive a common mobile communication service such as voice or data, the UE should be changed to an RRC connected state.

When a user turns on power of the UE, the UE first searches for an appropriate cell and stays an RRC idle state in the corresponding cell. When it is necessary that the UE in an RRC idle state performs an RRC connection, the UE establishes an RRC connection with the E-UTRAN through an RRC connection procedure and is changed to an RRC connected state. Several cases in which the UE in an RRC idle state should perform an RRC connection may include, for example, a case in which uplink data transmission is required with the reason such as a user's call attempt or a case of transmission of a response message when the UE receives a paging message from the E-UTRAN.

A non-access stratum (NAS) layer located at a superordinate layer of an RRC layer performs a function of session management and mobility management.

In the NAS layer, in order to manage mobility of the UE, two states of EPS Mobility Management-REGISTERED (EMM-REGISTERED) and EMM-DEREGISTERED are defined and are applied to the UE and the MME. An initial UE is in an EMM-DEREGISTERED state, and in order to access to the network, the UE performs a process of registering at the corresponding network through an initial attach procedure. When the attach procedure is successfully performed, the UE and the MME become an EMM-REGISTERED state.

In order to manage signaling connection between the UE and an EPC, two states of an EPS Connection Management (ECM)-IDLE state and an ECM-CONNECTED state are defined and are applied to the UE and the MME. When the UE of an ECM-IDLE state is RRC-connected with the E-UTRAN, the corresponding UE becomes an ECM-CONNECTED state.

When the MME in an ECM-IDLE state is S1-connected with E-UTRAN, the MME becomes an ECM-CONNECTED state. When the UE is in an ECM-IDLE state, the E-UTRAN does not have context information of the UE. Therefore, the UE in an ECM-IDLE state performs a UE-based mobility related procedure such as cell selection or cell reselection without necessity to receive a command of the network. However, when the UE is in an ECM-CONNECTED state, mobility of the UE is managed by a command of the network. In an ECM-IDLE state, when a location of the UE is different from a location in which the network knows, the UE notifies the network of a corresponding location thereof through a tracking area update procedure.

Hereinafter, system information will be described.

The system information includes indispensable information in which the UE should know in order to access to the eNB. Therefore, before the UE accesses to the eNB, the UE should receive the entire system information and always have update system information. Because the system information is information in which all UEs within one cell should know, the eNB periodically transmits the system information.

According to a chapter 5.2.2 of 3GPP TS 36.331 V8.7.0 (2009-09) "Radio Resource Control (RRC); Protocol specification (Release 8)", the system information is divided into a Master Information Block (MIB), a Scheduling Block (SB), and a System Information Block (SIB). The MIB enables the UE to know a physical configuration, for example, a bandwidth of a corresponding cell. The SB notifies transmission information, for example, a transmission cycle of SIBs. The SIB is an assembly of related system information. For example, any SIB includes only information of a peripheral cell and includes only information of an uplink radio channel in which the UE uses.

In order to enter from an RRC idle state to an RRC connected state, the UE transmits an RRC connection request message that requests connection to the network (S602). The network transmits an RRC connection setup message to the UE in response to the RRC connection request (S604). The UE receives the RRC connection setup message and enters an RRC connected state.

The UE transmits an RRC connection setup complete message used for determining successful completion of RRC connection establishment to the network (S606).

However, when the network may not perform an RRC connection, the network transmits an RRC connection reject message to the UE in response to the RRC connection request.

Figure 7:
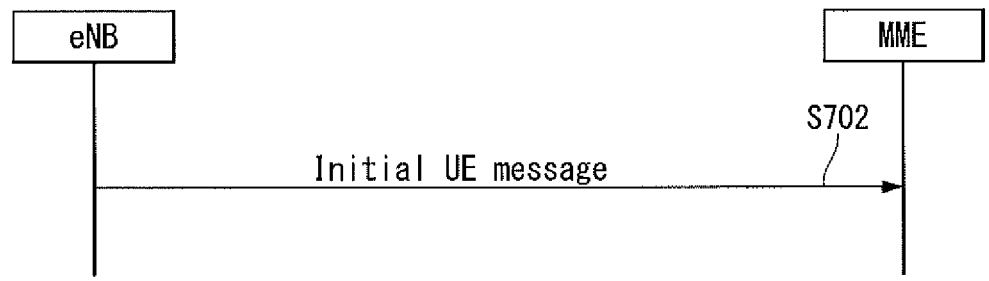
FIG. 7 is a flowchart illustrating a method of transmitting a Non Access Stratum (NAS) message to which the present invention may be applied.

FIG. 7 is a flowchart illustrating a method of transmitting a Non Access Stratum (NAS) message to which the present invention may be applied.

Referring to FIG. 7, the NAS message may be included in an Information Element (IE) of an initial UE message, a Downlink NAS Transport Message, or an Uplink NAS Transport Message to be transmitted to the MME (S702).

The NAS Transport is required for transmitting signaling between the UE and the MME through an S1 interface, and when the S1 interface is not connected, a procedure that sets the S1 interface may be first performed.

In this way, the UE may transmit Tracking Area Update (TAU) or a service request to the MME through the eNB and an initial UE message, which is the NAS message.

Figure 8:
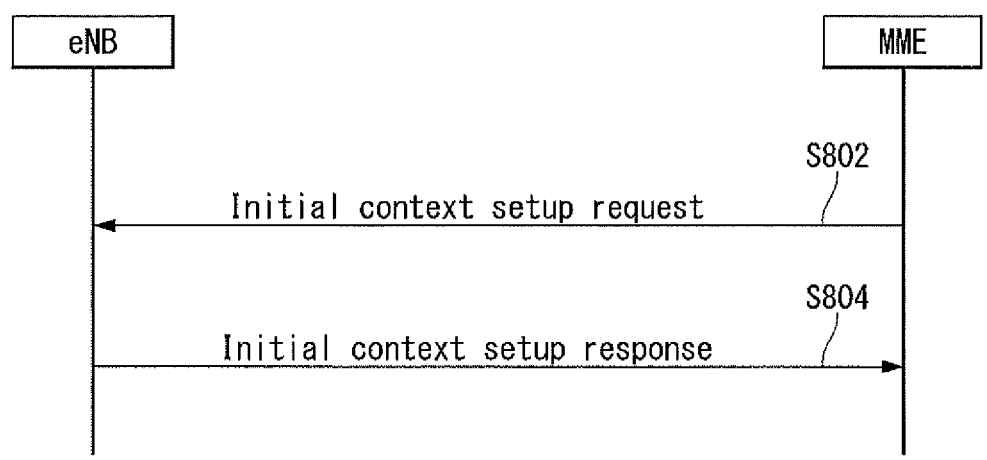
FIG. 8 is a flowchart illustrating an initial context setup method to which the present invention may be applied.

FIG. 8 is a flowchart illustrating an initial context setup method to which the present invention may be applied.

The initial context setup procedure is required for setting necessary entire UE context information, and the UE context information may include an E-RAB context, security key, Handover Restriction List, UE Radio Capability, and/or UE Security Capability. That is, the context information (or UE context information) may include overall information of the UE.

In this case, when the MME has such information, the UE Radio Capability information may be transmitted and thus when the MME does not initially know the UE, the UE Radio Capability information may not be transmitted.

For the initial context setup, the MME may transmit an initial context setup request message to the eNB (S802).

The eNB, having received the initial context setup request message transmits an initial context setup response in response to the initial context setup request message to the MME (S804) and performs an initial context setup procedure.

Figure 9:
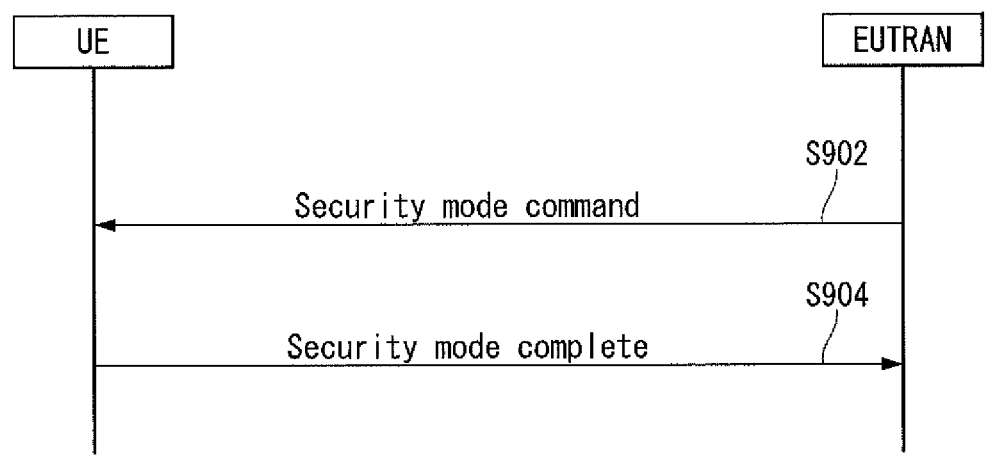
FIGS. 9 and 10 are a flowchart and a diagram, respectively, illustrating an example of a security key that may be used in an initial security activation and security procedure to which the present invention may be applied.
Figure 10:
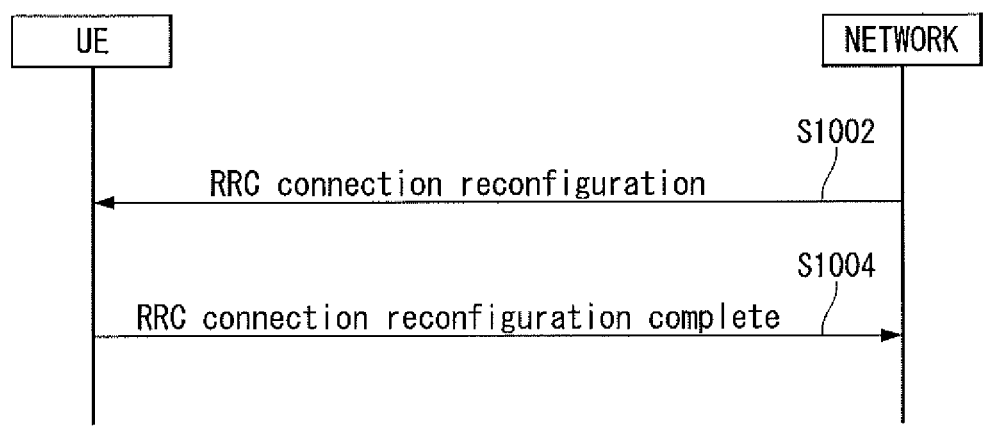

FIGS. 9 and 10 are a flowchart and a diagram, respectively, illustrating an example of a security key that may be used in an initial security activation and security procedure to which the present invention may be applied.

Referring to FIGS. 9 and 10, when the UE accesses to the network, an authentication procedure that determines whether the UE is a UE that may be accessed to the network is performed, and after the authentication procedure, in order to safely transfer data at Non Access Stratum (NAS) and Access Stratum (AS) segments, a security key is generated. Hereinafter, each procedure will be described in detail.

UE Authentication Procedure

The UE accesses to the network and requests access to the MME, and the MME, having received the access request from the UE identifies a corresponding UE with an IMSI and requests an authentication vector for authenticating the UE to the HSS.

The HSS generates an authentication vector AV(s)= {RAND, XRES, $AUTN_{HSS}$, $K_{ASME}$} using EPS Authentication and Key Agreement (AKA) algorithm based on the International Mobile Subscriber Identity (IMSI) and transmits the authentication vector AV(s)={RAND, XRES, $AUTN_{HSS}$, $K_{ASME}$} to the MME.

The MME stores the authentication vectors and selects one of the authentication vectors to perform mutual authentication with the UE. The MME transmits an RAND value and an $AUTN_{HSS}$ value of the selected authentication vector to the UE, and the UE performs EPS AKA algorithm using the received value and generates RES, $AUTN_{UE}$, and $K_{ASME}$ of FIG. 10.

The UE compares the generated $AUTN_{UE}$ value and the $AUTN_{HSS}$ value received from the MME to authenticate a network, and when network authentication is succeeded, the UE transmits the RES value to the MME. The MME compares XRES received from the HSS and the RES received from the UE to authenticate the UE. When mutual authentication is terminated, the UE and the MME have the same $K_{ASME}$.

NAS Security

When the UE and the MME terminate the mutual authentication and share the $K_{ASME}$, a NAS security setup procedure is started. The NAS Security procedure is a procedure that generates NAS security Keys for safely transmitting the NAS message with the $K_{ASME}$.

First, the MME selects NAS Security algorithms to generate an integrity key $K_{NASint}$ and an ciphering key $K_{NASenc}$ with the $K_{ASME}$.

The integrity key is a key for determining/protecting integrity and integrity determination/protection is to determine whether a transmitted and received message has been changed or whether the transmitted side is right.

The ciphering key is a key for ciphering message contents, and the transmitting side may encode and send message contents using a key value in which the transmitting side has and algorithm and the receiving side may decode a message with the same key and the same algorithm.

Thereafter, the MME applies the $K_{NASint}$ to a security mode command message to generate the Message Authentication Code for NAS for Integrity (NAS-MAC).

The MME transmits the security mode command message including the selected NAS Security algorithms and the authentication code to the UE. In this case, because the UE does not know ciphering information, only integrity protection is performed and the security mode command message is transferred.

The UE receives the security mode command message, verifies integrity of the received message using the selected NAS integrity algorithm, and generates NAS security keys ($K_{NASint}$ and $K_{NASenc}$) with the $K_{ASME}$ using NAS integrity/ciphering algorithm.

Thereafter, the UE applies and encodes the $K_{NASenc}$ to the security mode complete message, applies the $K_{NASint}$ to the ciphered message to generate NAS-MAC, which is a message authentication code, includes the NAS-MAC in the security mode complete message, and transmits the security mode complete message to the MME.

The MME receives the security mode complete message, and when integrity verification and decoding are succeeded using the NAS security keys ($K_{NASint}$ and $K_{NASenc}$), NAS security setup is successfully terminated.

AS Security Procedure

When a NAS Security setup procedure is terminated, an AS Security setup procedure between the UE and the eNB is performed. The MME calculates $K_{eNB}$ with the $K_{ASME}$ and transmits the $K_{eNB}$ to the eNB, and the eNB performs an AS security setup procedure using the $K_{eNB}$.

The eNB selects AS security algorithms (Alg-ID: Algorithm ID), obtains a ciphering key $K_{RRCenc}$ and an integrity key $K_{RRCint}$ to use for an RRC signaling message from the $K_{eNB}$, and generates an ciphering key $K_{UPenc}$ to use in a user plane. Further, the eNB applies the $K_{RRCint}$ to the security mode command message to generate a Message Authentication Code for Integrity (MAC-I).

Thereafter, the eNB transmits a security mode command message including the message authentication code and the selected AS security algorithms to the UE (S902).

The UE receives the security mode command message from the eNB, verifies integrity of the security mode command message using AS integrity algorithm selected by the eNB, and generates AS security keys ($K_{RRCint}$, $K_{RRCenc}$, $K_{UPenc}$) using AS integrity/ciphering algorithm.

Hereinafter, as a key used for ciphering in an exemplary embodiment of the present invention, the $K_{UPenc}$ or $K_{RRCenc}$ may be used or in order to transmit and receive data in an idle state, a new key may be generated from the $K_{ASME}$ and $K_{eNB}$, and as a key used for protecting integrity, the $K_{RRCint}$ may be used or in order to transmit and receive data in an idle state, a new key may be generated from the $K_{ASME}$ and $K_{eNB}$.

Thereafter, by applying the RRC integrity key to the security mode complete message, the UE generates MAC-I, which is a message authentication code, and includes the authentication code in the security mode complete message to transmit the security mode complete message to the eNB (S904).

When the eNB succeeds integrity verification of the received security mode complete message using the AS integrity key, AS security setup is successfully terminated.

The present invention suggests a method of generating a new ciphering key and an integrity key using the security keys or the $K_{ASME}$ and $K_{eNB}$ and enabling the UE and the MME to transmit and receive data.

Figure 11:
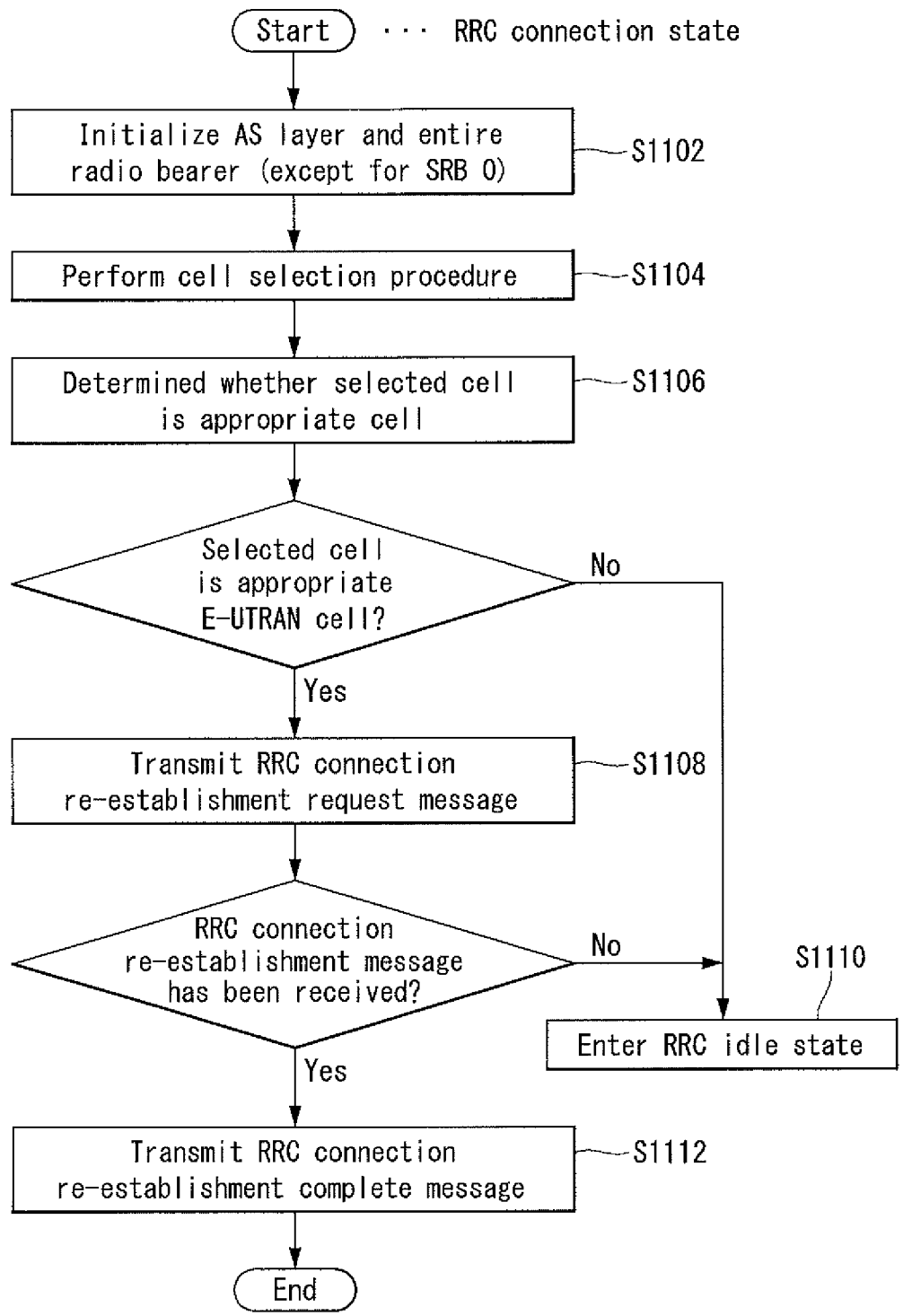
FIG. 11 is a flowchart illustrating an RRC connection reconfiguration process to which the present invention may be applied.

FIG. 11 is a flowchart illustrating an RRC connection reconfiguration process to which the present invention may be applied.

The RRC connection reconfiguration is used for modifying an RRC connection. The RRC connection reconfiguration is used for RB establishment/modify/release, handover execution, and measurement setup/modify/release.

The network transmits an RRC connection reconfiguration message for modifying an RRC connection to the UE (S1102). The UE transmits an RRC connection reconfiguration complete message used for determining successful completion of an RRC connection reconfiguration to the network in response to the RRC connection reconfiguration (S1104).

Hereinafter, an RRC connection re-establishment procedure will be described.

Figure 12:
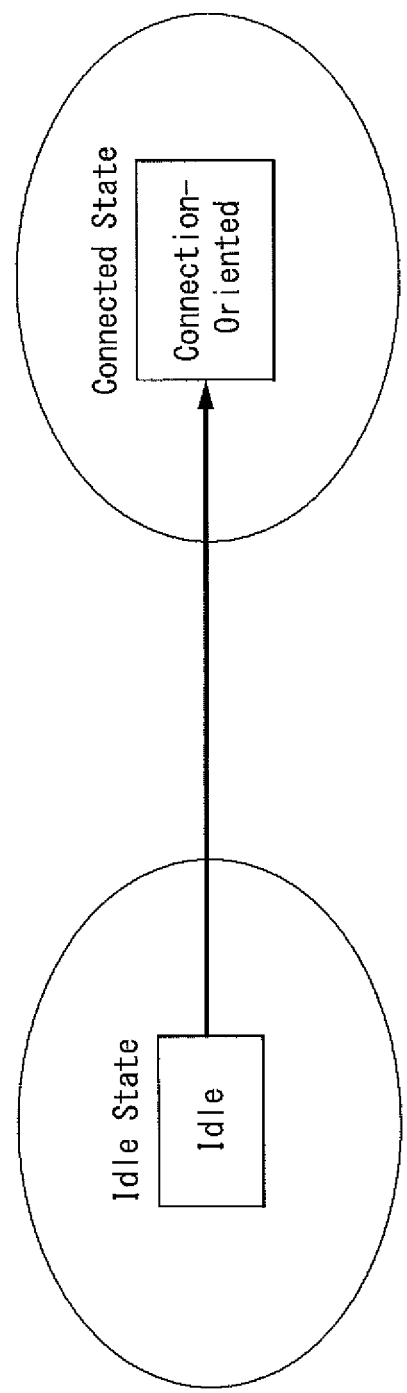
FIG. 12 is a flowchart illustrating an example of an RRC connection re-establishment procedure to which the present invention may be applied.

FIG. 12 is a flowchart illustrating an example of an RRC connection re-establishment procedure to which the present invention may be applied.

Referring to FIG. 12, the UE stops use of preset entire radio bearer, except for Signaling Radio Bearer (SRB 0) and initializes various sub-layers of Access Stratum (AS) (S1202).

Further, the UE sets each sub-layer and physical layer to a default configuration. In such a process, the UE maintains an RRC connected state.

The UE performs a cell selection procedure for performing an RRC connection re-establishment procedure (S1204). A cell selection procedure among an RRC connection re-establishment procedure may be performed to correspond with a cell selection procedure in which the UE performs in an RRC idle state, even if the UE maintains an RRC connected state.

The UE performs a cell selection procedure, determines system information of a corresponding cell, and determines whether the corresponding cell is an appropriate cell (S1206). If the selected cell is an appropriate E-UTRAN cell, the UE transmits an RRC connection re-establishment request message to the corresponding cell (S1208).

If a cell selected through a cell selection procedure for performing an RRC connection re-establishment procedure is a cell using another RAT other than an E-UTRAN, the UE stops an RRC connection re-establishment procedure and enters an RRC idle state (S1210).

The UE may be implemented to finish appropriateness determination of the cell within a limited time through a cell selection procedure and reception of system information of the selected cell. For this reason, the UE may start an RRC connection re-establishment procedure to run a timer. If the UE selects an appropriate cell, the timer may be stopped. When the timer is terminated, the UE may regard that an RRC connection re-establishment procedure was failed and enter an RRC idle state. Hereinafter, the timer is referred to as a radio link failure timer. In LTE spec TS 36.331, a timer named as T311 may be used as a radio link failure timer. The UE may acquire a setup value thereof from system information of a serving cell.

When the cell receives an RRC connection re-establishment request message from the UE and allows a request, the cell transmits an RRC connection re-establishment message to the UE.

The UE, having received the RRC connection re-establishment message from the cell reconfigures a PDCP sub-layer and an RLC sub-layer of SRB1. Further, the UE again calculates various key values related to security setup and reconfigures the PDCP sub-layer that performs security with newly calculated security key values.

Thereby, SRB 1 between the UE and the cell is opened and an RRC control message may be given and received. The UE completes restart of SRB1 and transmits an RRC connection re-establishment complete message in which an RRC connection re-establishment procedure has been complete to the cell (S1212).

However, when the UE receives an RRC connection re-establishment request message from the UE and does not allow the request, the cell transmits an RRC connection re-establishment reject message to the UE.

When an RRC connection re-establishment procedure is successfully performed, the cell and the UE perform an RRC connection re-establishment procedure. Thereby, the UE recovers a state before performing an RRC connection re-establishment procedure and guarantees continuity of the service to the maximum.

Figure 13:
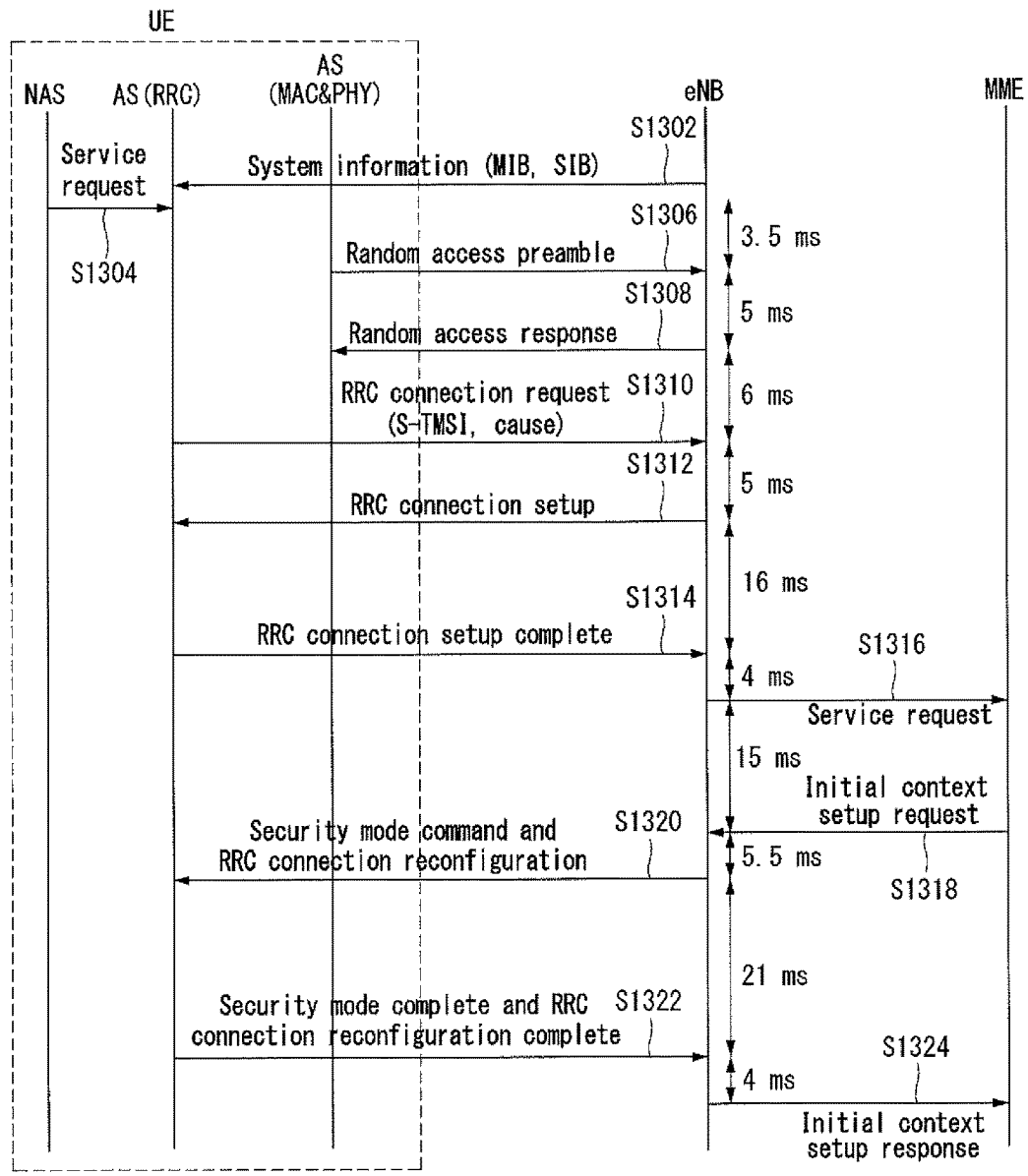
FIGS. 13 and 14 are a flowchart and a diagram, respectively, illustrating a method of converting from an idle state to a connected state and an example of a consumption time of an uplink resource allocation method.
Figure 14:
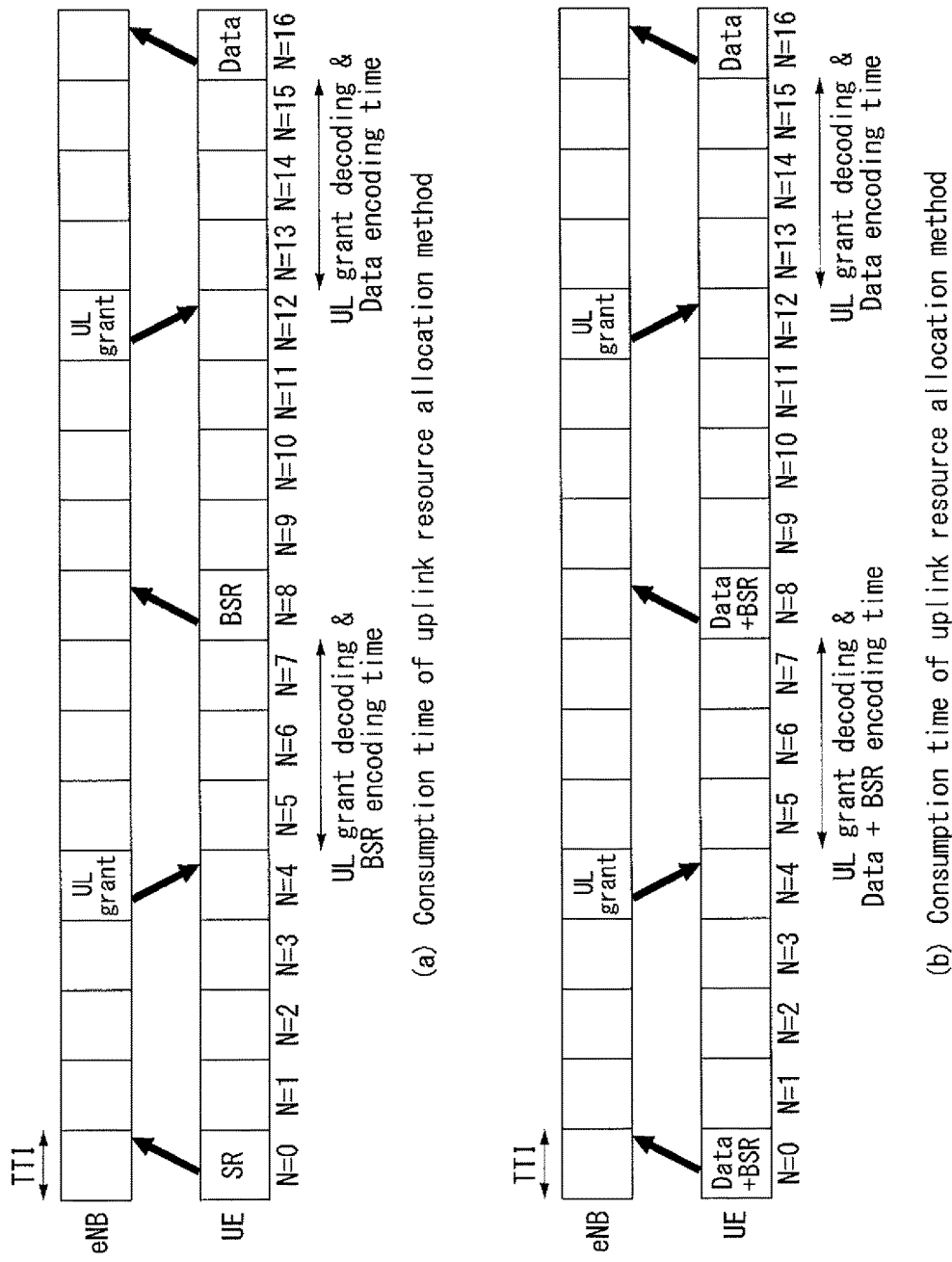

FIGS. 13 and 14 are a flowchart and a diagram, respectively, illustrating a method of converting from an idle state to a connected state and an example of a consumption time of an uplink resource allocation method.

Referring to FIGS. 13 and 14, in order to set a security session and a data session with the eNB, an UE of an idle state should perform an RRC connection procedure and for this, a predetermined time is consumed.

When describing in detail an RRC connection procedure, the UE receives system information from the eNB (S1302).

The system information may be classified into a Mater Information Block (MIB) or a System Information Block (SIB), and the MIB is transmitted through a PBCH, and the SIB is transmitted through a PDSCH.

A detailed description of the system information has been described in the foregoing description.

Thereafter, the UE transmits a service request to the RRC (or AS) layer in the NAS (within the UE) (S1304).

The UE receives and stores information about random access from the eNB through the system information, and when random access is required, the UE transmits a random access preamble to the eNB (S1306).

When the eNB receives the random access preamble from the UE, the eNB transmits a random access response message to the UE (S1308). Specifically, downward scheduling information about the random access response message may be CRC-masked with a Random Access-Radio Network Temporary Identifier (RA-RNTI) to be transmitted on an L1 or L2 control channel (PDCCH). The UE, having received downward scheduling signal masked with the RA-RNTI may receive and decode a random access response message from a Physical Downlink Shared Channel (PDSCH). Thereafter, the UE determines whether random access response information instructed thereto exists in the random access response message.

Whether random access response information instructed to the UE exists may be determined by whether a Random Access Preamble ID (RAID) of a preamble transmitted by the UE exists.

The random access response information includes Timing Alignment (TA) representing timing offset information for synchronization, radio resource allocation information used in an uplink, and a temporary identifier (e.g., Temporary C-RNTI) for distinguishing an UE.

Thereafter, in order to request RRC connection establishment with the eNB, the UE transmits an RRC connection request message to the eNB (S1310).

The RRC connection request message may include S-TMIS and a cause field.

The cause field may include information representing an object that transmits an RRC connection request message, and the object may represent an uplink resource allocation request for a low latency service (e.g., mobile originating urgent, mobile terminating urgent).

Thereafter, the UE receives an RRC connection setup message corresponding to a response to the RRC connection request message from the eNB (S1312).

The RRC connection setup message may include an UL resource response IE representing result information or response information about an uplink resource allocation request of the UE.

Further, the eNB may perform uplink resource allocation of the UE based on the UL resource request IE received from the UE.

The UE transmits an RRC connection setup complete message through an uplink resource allocated from the eNB (S1314).

The eNB, having received the RRC connection setup complete message notifies access of the UE while transmitting a service request message to the MME (S1316).

The MME, having received the service request message transmits context information of the UE including security information of the UE, data bearer information in which the UE uses, information about a serving gateway in which the eNB should transfer data sent by the UE, i.e., S1-U UL information (uplink bearer) GPRS Tunneling Protocol (GTP) tunnel ID (TEID) of the UE and an IP address of a serving gateway, and mobility management information of the UE to the eNB through an initial context setup request message (S1318).

Thereafter, for Access Stratum (AS) security and data bearer setup, the eNB transmits a security mode command and an RRC connection reconfiguration message to the UE (S1320).

The eNB interlocks with the UE based on context information of the UE received from the MME to set Access Stratum (AS) security and data bearer between the UE and the eNB.

When the AC security and data bearer setup is completed, the UE transmits security mode complete and RRC connection reconfiguration complete messages to the eNB (S1322).

Thereafter, the eNB notifies the MME that a context of the UE and data bearer setup have been successfully performed through an initial context setup response message (S1324).

In such an idle state, as shown in FIG. 13, as a conversion time to a connection mode according to RRC connection setup and data connection setup, a time of 35.5 ms is consumed for RRC connection setup and a time of 49.5 ms is consumed for security setup and data connection setup of a radio link (including no backhaul transmitting time).

Further, the UE converted to a connected state should request a radio resource for transmitting uplink data through a scheduling request, as shown in FIG. 14(a) or should request a radio resource for transmitting uplink data through a scheduling request and a buffer state report, as shown in FIG. 14(b).

In this case, in a case of FIG. 14(a), data transmission delay becomes 9.5 ms, and in a case of FIG. 14(b), data transmission delay becomes 17.5 ms.

Therefore, as shown in FIGS. 13 and 14, a time in which the UE in an idle state consumes for data transmission becomes 94 ms or 102.5 ms, which is the sum of 85 ms, which is a state conversion time of the UE for data transmission and reception and 9.5 ms or 17.5 ms, which is a radio resource occupation and data transmission time of the UE converted to a connected state.

However, there is a problem that such a consumption time has large delay in providing a low latency service that should quickly transmit information about various real time application services such as health care, traffic safety, disaster safety, and remote medical control, particularly, a specific event such as an accident or a state that may occur at a time that cannot be estimated by various end users such as a person or a machine (e.g., vehicle, sensor) to an eNB or a peripheral UE/user (hereinafter, data for providing the low latency service is referred to as low latency service data.).

Therefore, in order to solve such a problem, a method is suggested in which a UE can transmit and receive data without conversion to a connected state from an idle state in which data transmission delay of about 5 times occurs, compared with a UE in a connected state.

Figure 15:
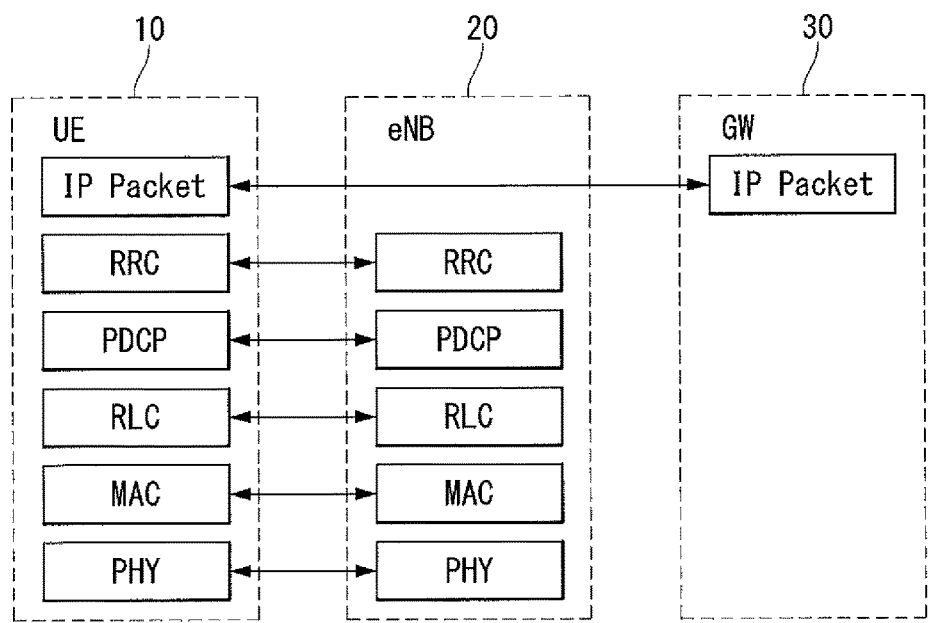
FIG. 15 is a diagram illustrating an example of a data transfer path to which the present invention may be applied.

FIG. 15 is a diagram illustrating an example of a data transfer path to which the present invention may be applied.

Referring to FIG. 15, an UE 10 may transmit and receive data to and from a gateway 40 (GW) via an eNB 20 without conversion from an idle state to a connected state.

In this case, in a user plane of the UE and the eNB, as described in FIG. 4, an RLC may have three modes of a transparent mode (TM), an acknowledged mode (AM), and an unacknowledged mode (UM).

When the RLC layer operates in the TM, no header information is added to an RLC SDU transferred from a superordinate layer and the RLC SDU is transparently transferred to an MAC layer. Therefore, even if an error occurs in a transmitting process, retransmission is not supported.

Further, the UE may apply integrity protection to RRC signaling using a newly generated integrity key or $K_{RRCint}$, which is an integrity key of FIG. 10 instead of an IP packet including data of RRC signaling, transmit the RRC signaling to the eNB, and encode and transmit the RRC signaling using $K_{UPenc}$ and $K_{RRCenc}$, which are ciphering keys or a newly generated ciphered key, as needed.

In the present invention, as described above, in uplink data or downlink data for providing the low latency service, the UE 10 and the gateway 40 transmit and receive data without a change from an idle state to a connected state, thereby quickly providing data for providing a low latency service.

Figure 16:
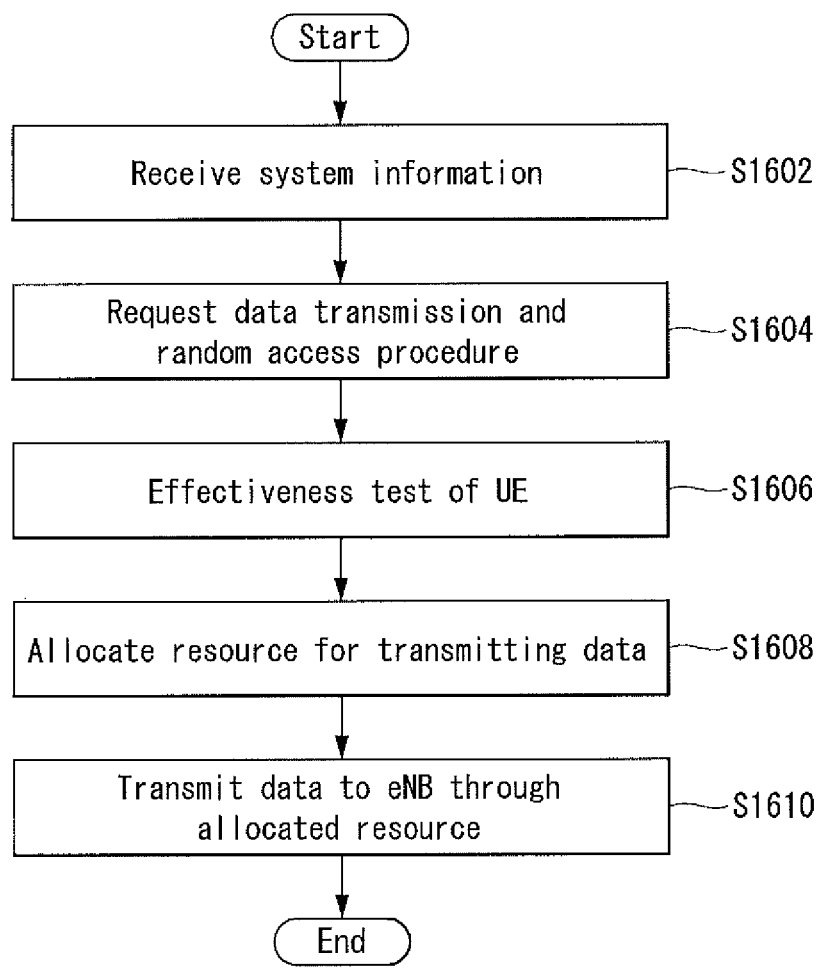
FIG. 16 is a flowchart illustrating an example of transmitting data in an idle state to which the present invention may be applied.

FIG. 16 is a flowchart illustrating an example of transmitting data in an idle state to which the present invention may be applied.

Referring to FIG. 16, an UE in an idle state may transmit and receive uplink data for providing a low latency service without a change to a connected state.

Specifically, it is assumed that the UE is in a state already registered at a network and that EPS bearer information corresponding to data to transmit exists within the network. That is, in the present invention, in order for the UE to transmit and receive low latency service data in an idle state, the UE may stop a discontinuous reception (DRX) operation, and context information of the UE may exist at the network. Further, the network may recognize a location of the UE.

In order to transmit uplink data for providing a low latency service without a change to a connected state, the UE in an idle state receives system information necessary for transmission of the data from an eNB (S1602).

Thereafter, the UE performs a random access procedure with the eNB and transmits a request message for transmitting low latency service data to the eNB through a resource allocated in this process to request a resource necessary for data transmission for providing a low latency service in an idle state to the eNB (S1604). The request message may be referred to as an RRC direct data transfer request message.

The eNB transmits information necessary for determining effectiveness (integrity) of the UE to a Mobility Management Entity (MME), and the MME performs an effectiveness (integrity) test of the UE based on information transmitted from the eNB and notifies the eNB of a test result (S1606).

The eNB may transmit a response message to the UE in response to the resource allocation request of the UE, allocate a resource for transmitting the low latency service data according to whether effectiveness (integrity) of the UE and a characteristic of transmitted data, and include the resource in the response message (S1608). The response message may be referred to as an RRC direct data transfer response message.

Thereafter, because the UE is effective, when a resource for transmitting the data is allocated, the UE integrity-protects and encodes a transfer message including the data using an integrity key and a ciphering key of FIG. 10 and transmits the transfer message to the eNB (S1610).

The eNB performs an integrity (effectiveness) test and decoding of the transfer message, transmits the data to the gateway, and transmits a transfer result to the UE.

Through such a method, the UE may transmit data to the gateway through the eNB even in an idle state. A detailed description of each step will be described hereinafter.

Figure 17:
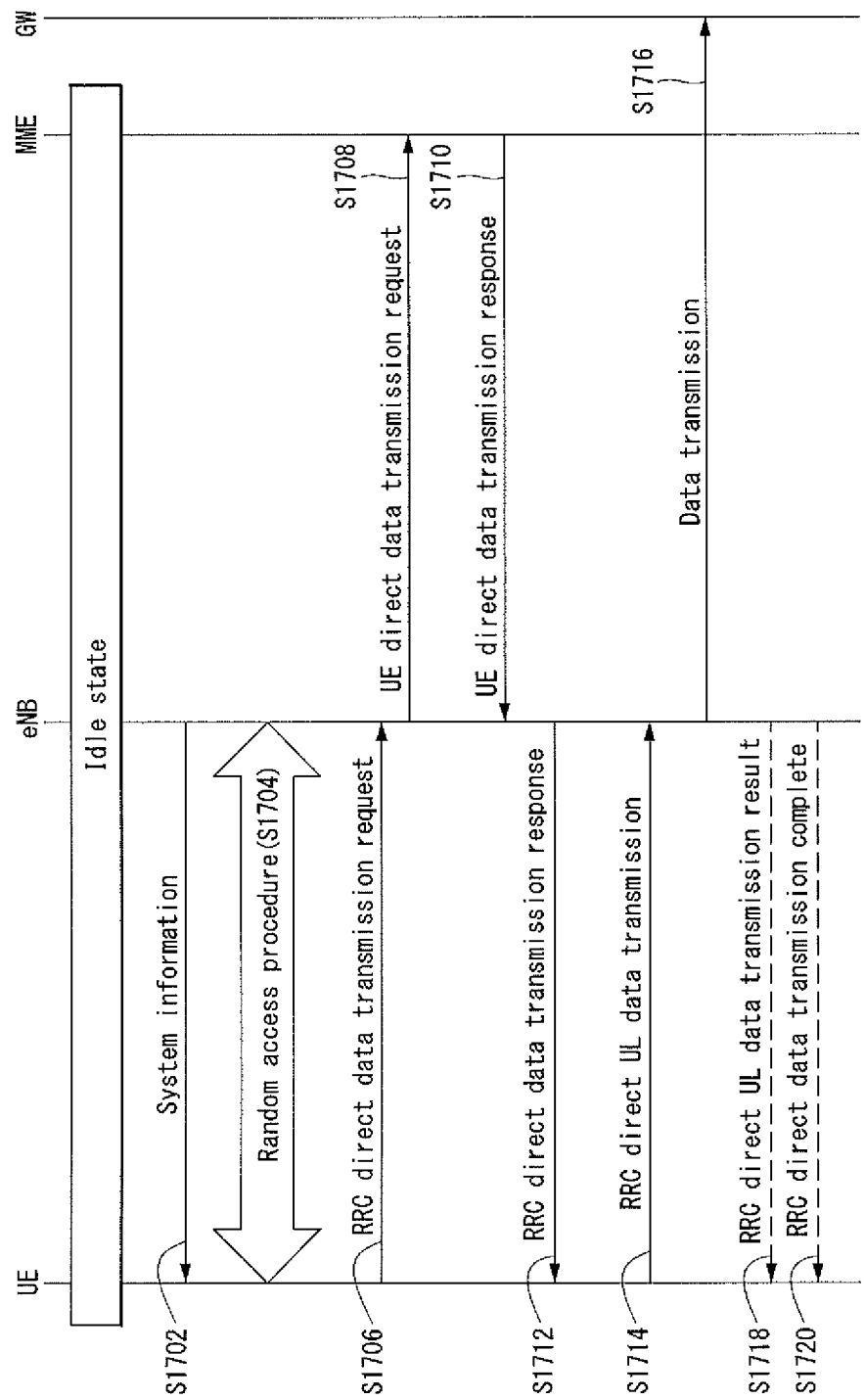
FIG. 17 is a flowchart illustrating an example of transmitting data in an idle state to which the present invention may be applied.

FIG. 17 is a flowchart illustrating an example of transmitting data in an idle state to which the present invention may be applied.

Referring to FIG. 17, after an effectiveness (integrity) test by a Mobility Management Entity (MME) in an idle state, the UE performs may transmit data for providing a low latency service to the gateway (GW) through the eNB.

Specifically, the UE may receive system information including information necessary for transmission of uplink data for providing the low latency service from the eNB (S1702).

The system information is a message in which the eNB periodically transmits and includes at least one of a support field representing whether the eNB supports data transmission and reception for providing a low latency service in an idle state, resource information using in a random access procedure for transmitting and receiving the data, and security algorithm supported by the eNB.

In this case, the support field, the resource information, and the security algorithm may be entirely transmitted through the same system information message or may be transmitted through a system information message having different cycles.

For example, the support field may be transmitted through a system information message (e.g., Master Information Block (MIB)) of a short cycle, and the resource information and the security algorithm may be transmitted through a system information message (e.g., System Information Block 2 (SIB 2)) in which random access resource information of general use is transferred.

When security algorithm included in the system information is the plural, the UE may select one thereof, and in this case, the security algorithm may be selected with the following method.

First, when the UE selects specific security algorithm, the UE may select one from each of ciphering algorithm (e.g., eea0, eea1, eea2, ee3-v1130) and integrity protection algorithm (e.g., eia0-v920, eia1, eia2, eia3-v1130) supported by the eNB.

The selected ciphering algorithm and the integrity protection algorithm may be transmitted to the eNB through step (S1706) or step (S1714).

Second, when the security algorithm is selected by a predetermined method, the UE and the eNB may select algorithm for guaranteeing ciphering and integrity by the predetermined same method. In this case, algorithm for guaranteeing the selected ciphering and integrity may not be explicitly transferred to the eNB.

The predetermined method may select, for example, algorithm having a largest value among algorithms in which the eNB and the UE may equally support. In this case, when ciphering algorithm supported by the eNB is eea1, eea2, and eea3-v1130, and when ciphering algorithm supported by the UE is eea and eea3-v1130, the selected ciphering algorithm may be eea30v1130, and in this case, the ciphering algorithm type may be defined to ENUMERATED to have a value of eea0=1, eea1=2, eea2=3, and eea3-v1130=4.

When the eNB does not support data transmission and reception for providing a low latency service in an idle state, the UE, having received the system information is changed to a connected state to transmit and receive data.

However, when the eNB supports data transmission and reception for providing a low latency service in an idle state, in order to transmit a request message for resource allocation for data transmission and reception of the low latency service data to the eNB, the UE performs a random access procedure of FIG. 13 with the eNB (S1704).

That is, the UE transmits a random access preamble to the eNB, and when the eNB receives the random access preamble, the eNB transmits a random access response message to the UE.

Specifically, downward scheduling information about the random access response message may be CRC-masked with a Random Access-Radio Network Temporary Identifier (RA-RNTI) to be transmitted on an L1 or L2 control channel (PDCCH). The UE, having received downward scheduling signal masked with the RA-RNTI may receive and decode a random access response message from a Physical Downlink Shared Channel (PDSCH). Thereafter, the UE determines whether random access response information instructed thereto exists in the random access response message.

Whether random connect response information instructed to the UE exists may be determined by whether a Random Access Preamble ID (RAID) of a preamble transmitted by the UE exists.

The random access response information includes Timing Alignment (TA) representing timing offset information for synchronization, radio resource allocation information used in an uplink, and a temporary identifier (e.g., Temporary C-RNTI) for distinguishing an UE.

When the eNB supports data transmission and reception for providing the low latency service in an idle state, the UE transmits the request message (or RRC Direct Data Transfer Request Message) that requests transmission of the data to the eNB through a resource allocated through the step (S1704) to request data transmission in an idle state (S1706).

The request message may include a message type field representing a message kind, an UE ID IE field representing a UE identifier for distinguishing the UE, a Tx indicator representing whether the request message is a message for transmission of the low latency service data or a message for reception, and a data NAS IE field representing information for determining effectiveness of the UE when the request message is a request (i.e., uplink data) for transmission of the low latency service data.

The UE ID IE may include a Mobility Management Entity (MME) identifier that manages the UE and an identifier that distinguishes the UE within the MME. More specifically, the UE ID IE may include at least one of a Public Land Mobile Network Identifier (PLMN ID), which is a network identification number, a MME group identifier (MMEGI), a MME Code (MMEC) representing a MME code identifier, an MME Temporary Mobile Subscriber Identity (M-TMSI) representing a UE identifier, a parameter that distinguishes an identifier allocated to the MME that supports which communication technology, and a parameter that distinguishes an identifier allocated to another entity other than the MME.

When a direct communication path (e.g., S1 interface) does not exist between the eNB and an MME corresponding to the MME identifier, the eNB may request context information processing and authentication of the UE to another MME, and the MME and the another MME may exchange context information of the UE.

The Data NAS IE field may include a Security IE field including info nation for determining effectiveness (integrity) of the UE and a Quality of Service Information Element (QoS IE) field representing a characteristic of data to transmit.

The Security IE field may include at least one of a Security header type representing whether security is applied to the Data IE field, a key set identifier for distinguishing an EPS security Context, a NAS count, and a Message Authentication Code (MAC) representing an authentication code for determining integrity.

The security header type may represent one of not security protected representing that security was not applied, Integrity Protected representing that only integrity protection is applied, and Integrity protected and ciphered representing that both integrity protection and ciphering are applied according to applied security.

The QoS IE field may be configured with fields for representing a characteristic of data to transmit and may include at least one of an EPS Bearer ID for distinguishing a session of the data, and a data size representing a size of the data.

The eNB may include the UE ID IE field received through the request message and the Data NAS IE field in a data transfer request message (or UE Data transfer request message) and transmit the data transfer request message (or UE Data transfer request message) to the MME (S1708), and an S1 Application protocol between the eNB and the MME may be used.

Thereafter, the MME performs an effectiveness (integrity) test of the UE according to information included in a Security IE field of the Data NAS IE field received through the data transfer request message.

If the UE is not effective, the MME may notify the eNB through a data transfer response message (or UE Data transfer response message) that the UE is not effective. For example, it is determined that the UE is not effective with failure in authentication or the MME may notify the eNB through the UE data transfer message that EPS bearer for distinguishing the data is not effective.

However, if the UE is effective, the MME includes security related information for ciphering and integrity protection of transmitted messages or information related to data to transmit in an idle state in the data transfer response message and transmits the data transfer response message to the eNB (S1710).

The security related information may include ciphering algorithm supported by the UE, integrity guaranteeing algorithm supported by the UE, and/or a basic key (e.g., $K_{eNB}$) for generating keys for guaranteeing ciphering and integrity in an AS Security procedure of FIG. 10.

Information related to the data may include an EPS bearer ID for distinguishing a session for transmitting the data, a Quality of Service (QoS) representing a characteristic of the data, a size of the data, an address of a gateway to transmit the data, and/or a tunnel ID representing a tunnel for transmitting the data to the gateway.

In this case, when selecting algorithm for guaranteeing ciphering algorithm and integrity by the foregoing predetermined method, the eNB may receive algorithm for guaranteeing ciphering and integrity supported by the UE from the MME and thus the eNB may know algorithm in which the UE uses for guaranteeing ciphering and integrity.

The eNB may receive the UE data transfer response message that the UE is effective, determine a resource allocation time point and a resource allocation size according to a Quality of Service (QoS) corresponding to an EPS bearer ID of the data in which the UE is to transmit, for example, a QCI of Table 1, or transmission urgency according to a size of the data, and include a UL resource IE field representing corresponding resource allocation information in a response message (or RRC Direct Data Transfer response message) to transmit the response message (or RRC Direct Data Transfer response message) to the UE (S1712).

Table 1 represents an example of the QCI,

TABLE 1

| QCI | Resource Type | Priority Level | Packet Delay Budget | Packet Error Loss Rate | Example Services |
|---|---|---|---|---|---|
| 1 | GBR | 2 | 100 ms | 10-2 | Conversational Voice |
| 2 | | 4 | 150 ms | 10-3 | Conversational Video (Live Streaming) |
| 3 | | 3 | 50 ms | 10-3 | Real Time Gaming |
| 4 | | 5 | 300 ms | 10-6 | Non-Conversational Video (Buffered Streaming) |
| 65 | | 0.7 | 75 ms | 10-2 | Mission Critical user plane Push To Talk voice (e.g., MCPTT) |
| 66 | | 2 | 100 ms | 10-2 | Non-Mission-Critical user plane Push To Talk voice |
| 5 | Non-GBR | 1 | 100 ms | 10-6 | IMS Signalling |
| 6 | | 6 | 300 ms | 10-6 | Video (Buffered Streaming), TCP-based (e.g., www, e-mail, chat, ftp, p2p file sharing, progressive video, etc.) |
| 7 | | 7 | 100 ms | 10-3 | Voice, Video (Live Streaming), Interactive Gaming |
| 8 | | 8 | 300 ms | 10-6 | Video (Buffered Streaming), TCP-based (e.g., www, e-mail, chat, ftp, p2p file, sharing, progressive video, etc.) |
| 9 | | 9 | | | |
| 69 | | 0.5 | 60 ms | 10-6 | Mission Critical delay sensitive signalling (e.g., MC-PTT signalling) |
| 70 | | 5.5 | 20 ms | 10-6 | Mission Critical Data (e.g. example services are the same as QCI 6/8/9) |

The response message may be included and transmitted in an RRC message, MAC message, or MAC header form.

Figure 18:
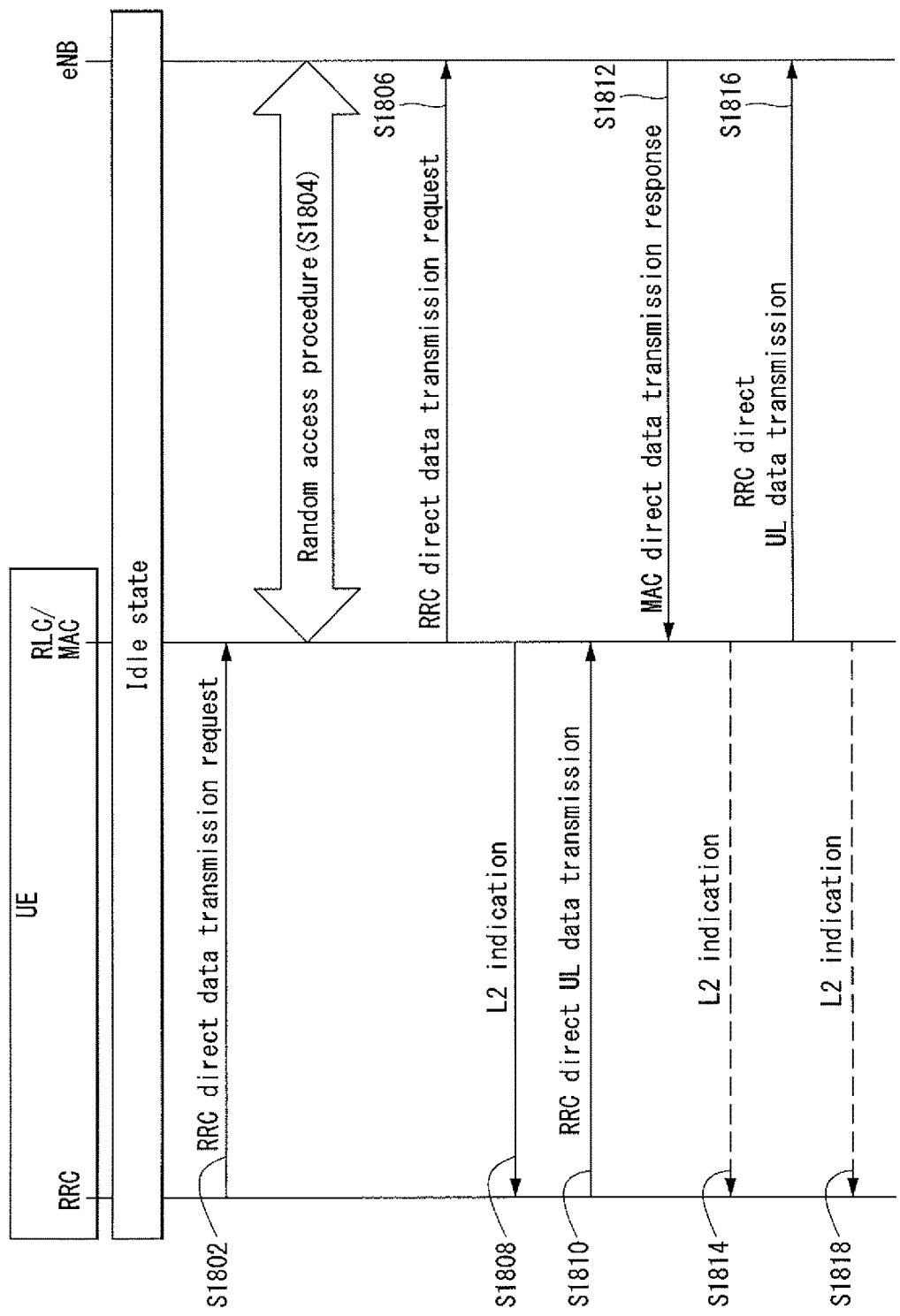
FIG. 18 is a flowchart illustrating an internal procedure of a terminal when transmitting data in an idle state to which the present invention may be applied.

When the direct data transfer response message is transmitted in an MAC message form, an internal procedure of the UE of FIG. 18 may be performed.

Further, in a random access process, because a plurality of UEs that select the same resource and random access code (or preamble) may exist, the response message may include a target UE ID IE field representing a UE to which the allocated resource is allocated.

The target UE ID IE field may be configured with at least one field including an UE ID IE received at the step (S1706).

Table 2 represents an example of a data format of the response message.

TABLE 2

| Oct 1 | Target UE ID IE |
|---|---|
| Oct 2 | Target UE ID IE |
| Oct 3 | Target UE ID IE |

TABLE 2-continued

| | |
|---|---|
| Oct 4 | Target UE ID IE |
| Oct 5 | Target UE ID IE |
| Oct 6 | UL Resource IE |
| Oct 7 | UL Resource IE |

The UE includes a data IE field including data for providing a low latency service, i.e., the low latency service data and an EPS bearer ID corresponding to the low latency service in a transfer message (or RRC UL Data Transfer Message) and transmits the transfer message (or RRC UL Data Transfer Message) to the eNB (S1714).

The transfer message is ciphered and integrity-protected by the UE. That is, a PDCP layer of the UE performs integrity protection in the transfer message using integrity protection algorithm determined at the step (S1702). In this case, an input field of the integrity protection algorithm may be a Count (e.g., Hyper frame number+PDCP sequence number), a direction representing a transmitting direction of the low latency service data, a Bearer ID for distinguishing the low latency service data, an integrity protection key for integrity protection in an AS Security procedure of FIG. 10, and the transfer message.

A Message Authentication Code for Integrity (MAC-I) output as an execution result of the integrity protection algorithm passes through a ciphering procedure together with the transfer message.

The ciphering procedure is performed using ciphering algorithm determined at the step (S1702). An input field of the ciphering algorithm may be a Count (e.g., Hyper frame Number+PDCP sequence number), a Direction representing a transmitting direction of the data, a Bearer ID for distinguishing the data, a key for ciphering in an AS Security procedure of FIG. 10, and a length of a key stream.

The transfer message and the authentication code may be masked (XOR operation) by ciphering key stream output as a result of the ciphering algorithm to be ciphered.

Thereafter, a PDCP layer of the UE adds a PDCP header including a security type representing whether security of the transfer message is applied.

The security type may represent one of not security protected representing that security was not applied, Integrity Protected representing that only integrity protection is applied, and Integrity protected and ciphered representing that both integrity protection and ciphering are applied according to applied security.

The eNB, having received the transfer message decodes the transfer message, determines whether integrity, and determines whether to transmit the low latency service data to the gateway (e.g., S-GW, P-GW, Edge-GW, Centralized GW) according to a result thereof.

That is, when the transfer message transmitted from the UE is changed or damaged, the eNB may transmit the low latency service data to a gateway corresponding to an EPS Bearer ID of the low latency service data (S1716), and notify the UE whether transmission of the low latency service data is succeeded through a transfer result message (S1718).

Thereafter, the eNB may transmit a complete message (or RRC Data Transfer Complete message) to the UE to notify that a transmitting procedure of the low latency service data has been complete (S1720).

A UE identifier (e.g. Temporary C-RNTI, C-RNTI) acquired at the steps (S1704, S1712) may be released by transmission and reception of the transfer result message or the complete message. In this case, a release time point may be a transmitting and receiving time point of the messages, a time point in which a previously defined effective period has elapsed, or a time point in which an explicitly included time within a corresponding message has elapsed.

In the present exemplary embodiment, the step (S1718) and the step (S1720) may be omitted.

Through such a method, the UE may transmit uplink data, i.e., low latency service data to the gateway even in an idle state to transmit and receive data without a delay time consumed in a connection process.

FIG. 18 is a flowchart illustrating an internal procedure of a UE when transmitting data in an idle state to which the present invention may be applied.

Referring to FIG. 18, as shown in FIG. 17, when the response message is transmitted in a MAC message form, an RRC layer within the UE may receive primitive in which a message has been transmitted from a subordinate layer.

Specifically, an RRC layer of the UE transmits a request message (or RRC Direct data transfer message) that requests uplink data transmission in an idle state to a subordinate layer (e.g., RLC, MAC) (S1802).

Hereinafter, step (S1804) and step (S1806) are the same as step (S1702) and step (S1704) of FIG. 17 and therefore a description thereof will be omitted.

When the request message is successfully transmitted to the eNB, the subordinate layer of the UE may transmit L2 Indication primitive in which the message has been normally transmitted to the RRC layer (S1808).

Thereafter, the RRC layer transfers a transfer message (or RRC Direct UL data transfer message) including low latency service data to the corresponding subordinate layer (S1810). The subordinate layer of the UE may receive the response message (or MAC Direct data transfer response message) of a MAC message form of FIG. 17 from the eNB (S1812) and transfer L2 Indication primitive to the RRC layer to notify that an uplink resource has been allocated (S1814).

The subordinate layer of the UE may transmit the transfer message (RRC Direct UL data transfer message) of FIG. 17 to the eNB through the allocated resource (S1816) and notify the RRC layer through the L2 indication primitive that the transfer message has been successfully transmitted to the eNB (S1818).

In this case, whenever the RRC layer of the UE transfers the request message and the transfer message to the subordinate layer, the RRC layer operates a preset timer with a previously defined value. When the timer receives transmission success primitive from the subordinate layer, the timer is stopped.

When the UE does not receive primitive in which transmission has been succeeded or receives primitive in which transmission was failed until a corresponding timer is terminated, the UE may select another eNB and transmit a message to the another eNB.

For example, although the message has been transmitted with the maximum HARQ retransmission number, when HARQ NACK is received, the MAC layer may determine that transmission was failed and transmit primitive in which transmission was failed in the RRC layer.

Figure 19:
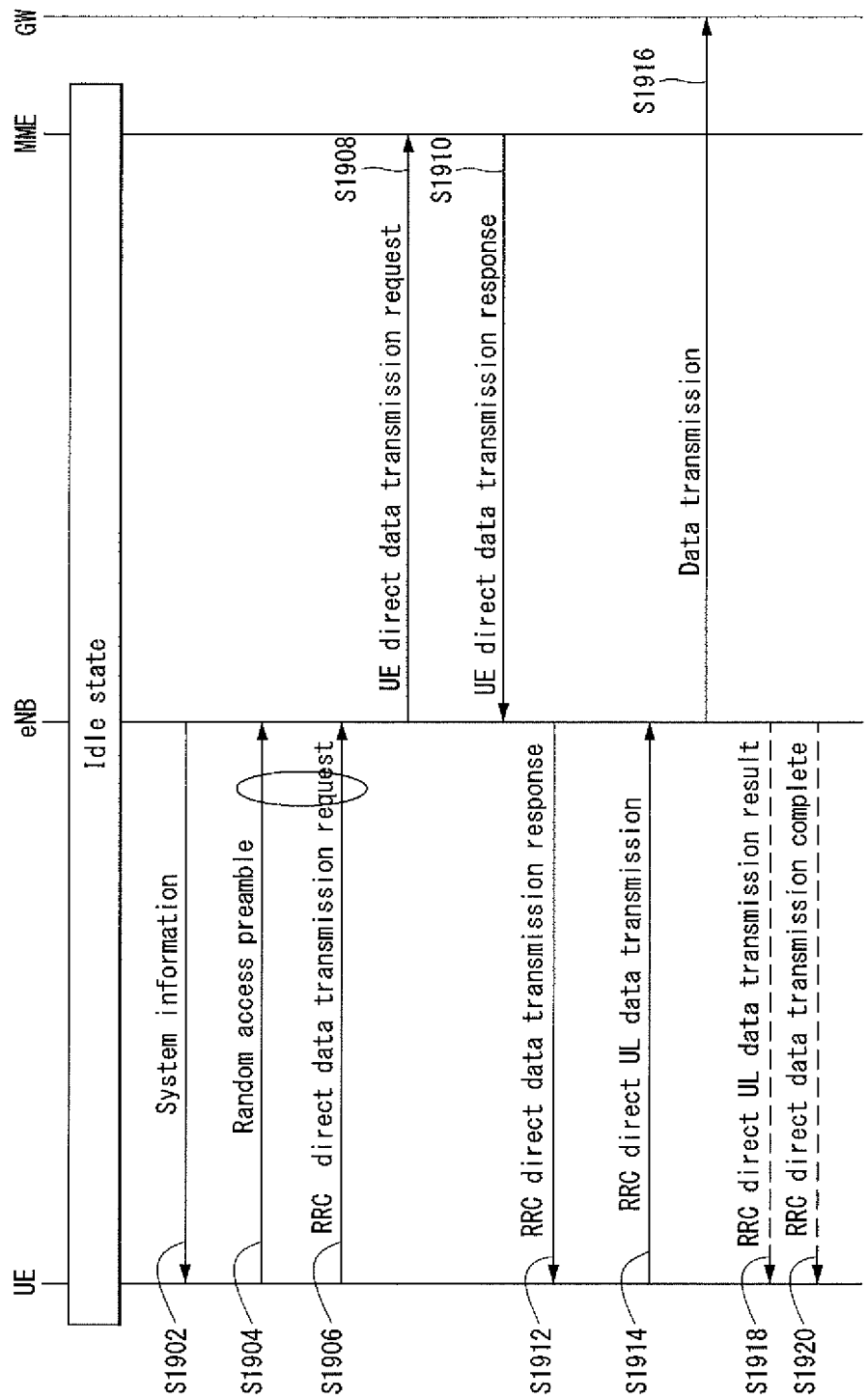
FIG. 19 is a flowchart illustrating an example of receiving data in an idle state to which the present invention may be applied.

FIG. 19 is a flowchart illustrating another example of transmitting data in an idle state to which the present invention may be applied.

First, step (S1902) is the same as step (S1702) of FIG. 17 and therefore a description thereof will be omitted.

Thereafter, the UE may simultaneously transmit a random access preamble (S1904) that transmits in order to perform a random access procedure for allocating an uplink resource and uplink data, i.e., a request message (or RRC direct data transfer request message) for transmitting low latency service data (S1906).

The request message is the same message as a request message transmitted at step (S1706) of FIG. 17.

Hereinafter, step (S1908) to step (S1920) are the same as step (S1708) to step (S1720) of FIG. 17 and therefore a description thereof will be omitted.

Figure 20:
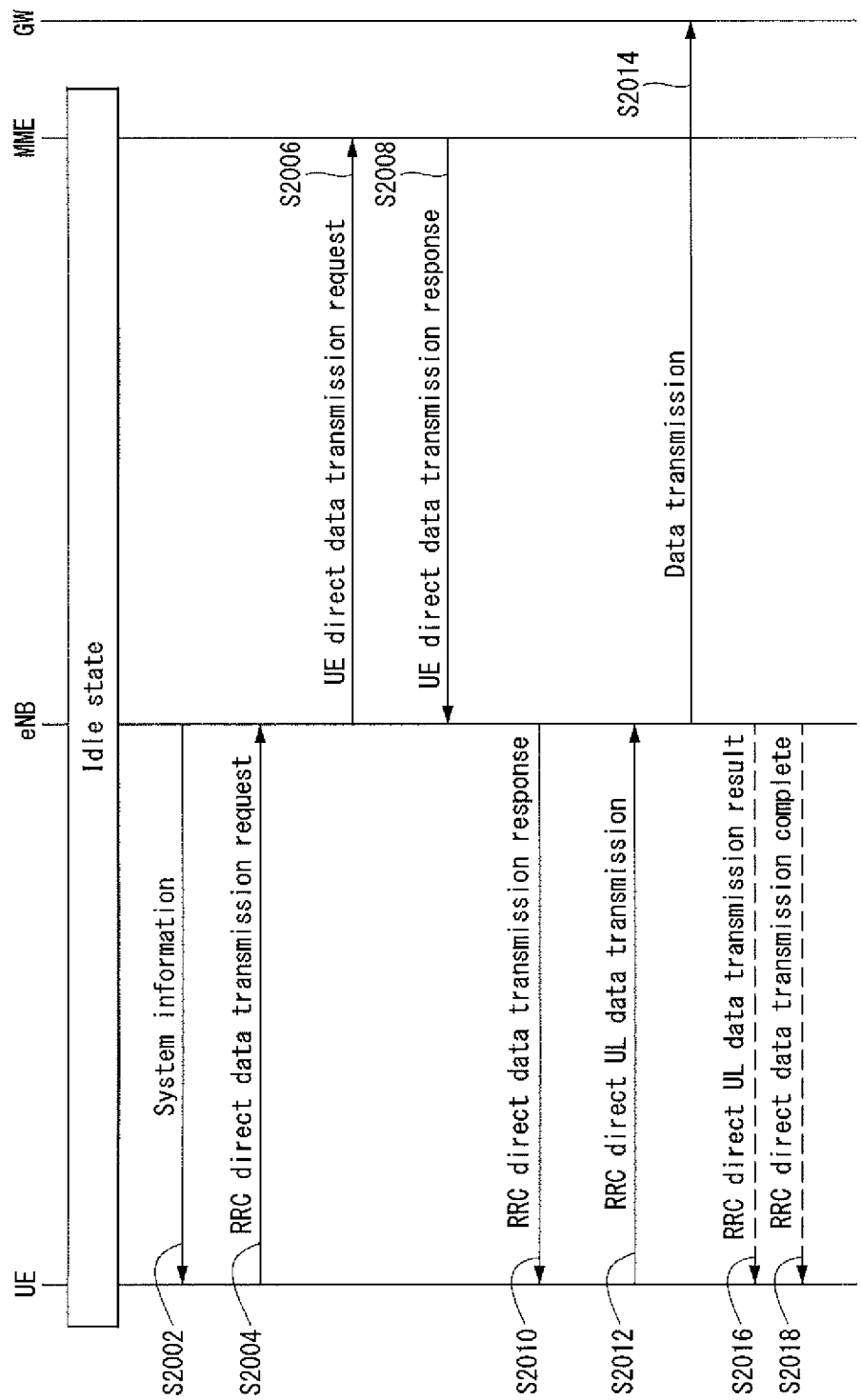
FIG. 20 is a flowchart illustrating an example of transmitting data in an idle state using a competition resource to which the present invention may be applied.

FIG. 20 is a flowchart illustrating another example of transmitting data in an idle state to which the present invention may be applied.

Referring to FIG. 20, the UE may request data transmission to the eNB through a resource that may be used by other apparatuses instead of a resource allocated to the UE to transmit uplink data for providing a low latency service.

First, step (S2002) is the same as step (S1702) of FIG. 17 and therefore a description thereof will be omitted.

When it is unnecessary that the UE in an idle state, having received the system information synchronizes with the eNB, the UE may not perform a random access procedure with the eNB.

Therefore, because the UE does not receive allocation of an uplink resource from the eNB, in order to transmit uplink data for providing a low latency service to the eNB through a competition resource that can be used by other apparatuses, the UE transmits a request message (or RRC Direct data transfer request message) to the eNB (S2004).

The request message is the same as the request message transmitted at step (S1706) of FIG. 17.

Hereinafter, step (S2006) to step (S2018) are the same as step (S1708) to step (S1720) of FIG. 17 and therefore a description thereof will be omitted.

Figure 21:
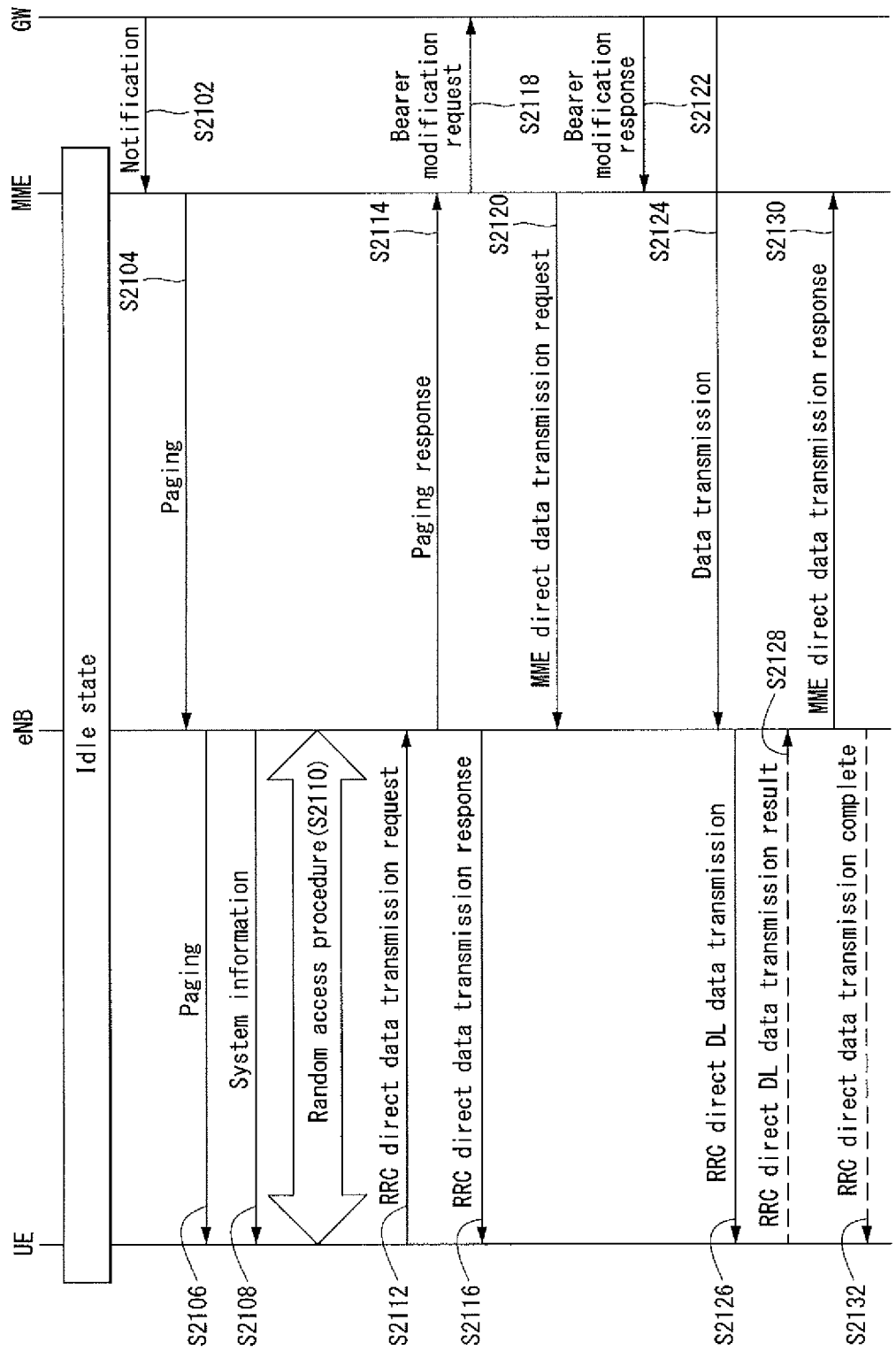
FIG. 21 is a flowchart illustrating an example of receiving data in an idle state to which the present invention may be applied.

FIG. 21 is a flowchart illustrating an example of receiving data in an idle state to which the present invention may be applied.

Referring to FIG. 21, DL data for providing a low latency service may be transmitted to a UE in an idle state.

Specifically, when urgent data transmitted from a gateway (e.g., S-GW, P-GW, Edge-GW, Centralized GW) to the UE or data for providing a low latency service, i.e., low latency service data occur, the gateway may notify a Mobility Management Entity (MME) through a notification message that the low latency service data have occurred (S2102).

The MME, having received the notification message transmits a paging message to the eNB in order to transmit the low latency service data to the UE (S2104), and the eNB transmits the paging message to the UE (S2106)

The paging message may include an UE ID IE field representing a UE to transmit the data, a data transmission condition IE field representing a condition for determining a method in which the UE is to receive the data, and a support IE field including system information necessary for transmitting and receiving data in an idle state.

The data transmission condition IE field includes at least one of an indicator that instructs whether to transmit and receive data in an idle state, a QCI representing a characteristic of the data of Table 1, required packet delay representing packet transmitting and receiving delay required for providing the low latency service, and an EPS bearer ID corresponding to the data.

The support IE field includes at least one of whether the eNB supports data transmission and reception for providing a low latency service in an idle state, resource information for a random access procedure, and security algorithm supported by the eNB.

In this case, the support IE field may be transmitted through system information message in which the eNB transmits (S2108).

When security algorithm included in the paging message or the system information message is the plural, the UE may select one thereof, and in this case, the UE may select the security algorithm with the following method.

First, when the UE selects specific security algorithm, the UE may select one from each of ciphering algorithm (e.g., eea0, eea1, eea2, ee3-v1130) and integrity guarantee algorithm (e.g., eia0-v920, eia1, eia2, eia3-v1130) supported by the eNB.

The selected ciphering algorithm and the integrity guarantee algorithm may be transmitted to the eNB through step (S2112).

Second, when the security algorithm is selected by a predetermined method, the UE and the eNB may select algorithm for guaranteeing ciphering and integrity by the predetermined same method. In this case, algorithm for guaranteeing the selected ciphering and integrity may not explicitly transferred to the eNB.

The predetermined method may select, for example, algorithm having a largest value among algorithms in which the eNB and the UE may equally support. In this case, when ciphering algorithm supported by the eNB is eea1, eea2, and eea3-v1130 and when ciphering algorithm supported by the UE is eea and eea3-v1130, the selected ciphering algorithm may be eea3ov1130, and in this case, the ciphering algorithm type is defined to ENUMERATED to have a value of eea0=1, eea1=2, eea2=3, and eea3-v1130=4.

When the eNB does not support data transmission and reception for providing a low latency service in an idle state, in order to change to a connected state to transmit and receive data, the UE, having received the system information performs the random access procedure of FIG. 13 with the eNB.

However, when at least one of the following conditions included in the transmission condition IE field is satisfied, in order to transmit a request message for requesting resource allocation for transmitting and receiving the low latency service data, the UE performs a random access procedure of FIG. 13 with the eNB (S2110).

When the indicator included in the paging message instructs data transmission and reception in an idle state Receive a paging message including a QCI in which a packet delay budget is a specific value or less Receive a paging message including an EPS bearer ID in which a packet delay budget is a specific value or less Receive a paging message in which required packet delay is a specific value or less In the random access procedure, the UE transmits a random access preamble to the eNB, and when the eNB receives the random access preamble, the eNB transmits a random access response message to the UE, Specifically, downward scheduling information about the random access response message may be CRC-masked with a Random Access-Radio Network Temporary Identifier (RA-RNTI) to be transmitted on an L1 or L2 control channel (PDCCH). The UE, having received downward scheduling signal masked with the RA-RNTI may receive and decode a random access response message from a Physical Downlink Shared Channel (PDCCH). Thereafter, the UE determines whether random access response information instructed thereto exists in the random access response message.

Whether random connect response information instructed to the UE exists may be determined by whether a Random Access Preamble ID (RAID) of a preamble transmitted by the UE exists.

The random access response information includes Timing Alignment (TA) representing timing offset information for synchronization, radio resource allocation information used in an uplink, and a temporary identifier (e.g., Temporary C-RNTI) for distinguishing an UE.

When the eNB supports data transmission and reception for providing the low latency service in an idle state, the UE transmits a request message (or RRC Data Transfer Request Message) that requests transmission of the low latency service data to the eNB through a resource allocated through the step (S2110) to request data reception for providing a low latency service in an idle state (S2112).

The request message may include a message type field representing a message kind, an UE ID IE field representing a UE identifier for distinguishing the UE, a Tx indicator representing whether the request message is a message for requesting data transmission or a message for requesting data reception, and a data NAS IE field representing information for determining effectiveness of the UE when the message is a request for data reception (i.e., downlink data).

The UE ID IE may include a MME identifier that manages the UE and an identifier that distinguishes the UE within a corresponding MME. More specifically, the UE ID IE may include at least one of a Public Land Mobile Network Identifier (PLMN ID), which is a network identification number, a MME group identifier (MMEGI), a MME Code (MMEC) representing a MME code identifier, a MME Temporary Mobile Subscriber Identity (M-TMSI) representing a UE identifier, a parameter that distinguishes an identifier allocated to the MME that supports which communication technology, and a parameter that distinguishes an identifier allocated to another entity other than the MME.

When a direct communication path (e.g., S1 interface) does not exist between the eNB and an MME corresponding to the MME identifier, the eNB may request context information processing and authentication of the UE to another MME, and the MME and the another MME may exchange context information of the UE.

The data NAS IE field may include a security IE field including information for determining effectiveness (integrity) of the UE.

The Security IE field may include at least one of a security header type representing whether security is applied to the data IE field, a key set identifier for distinguishing an EPS security context, a NAS count, and a Message Authentication Code (MAC) representing an authentication code for determining whether integrity.

The security header type may represent one of not security protected representing that security was not applied, integrity protected representing that only integrity protection is applied, and integrity protected and ciphered representing that both integrity protection and ciphering are applied according to applied security.

The eNB may transmit a paging response message including the Data NAS IE field and the UE ID IE field received through the request message to the MME in response to the paging message (S2114), and an S1 Application protocol between the eNB and the MME may be used.

Further, the eNB may transmit the response message (or RRC Direct data transfer response message) to the UE in response to the request message, and the response message may include a target UE ID field representing a UE to which the low latency service data are transmitted (S2116).

Thereafter, the MME performs an effectiveness (integrity) test of the UE according to information included in a Security IE field of the Data NAS IE field received through the paging response message.

If the UE is not effective, the MME may notify the eNB through a data transfer request message (or MME Direct data transfer request message) that the UE is not effective. For example, the MME may notify the eNB through the data transfer request message that the UE is determined to ineffective with failure in authentication or that an EPS bearer for transmitting the data is not effective.

However, if the UE is effective, the MME may notify a gateway corresponding to an EPS Bearer ID of the data of information of the eNB to transmit the data and a tunnel ID, and state information of the UE, i.e., that the low latency service data are transmitted in an idle state of the UE (S2118).

In this case, information of the eNB, the tunnel ID, and state information of the UE may be transmitted through a message such as a bearer modification request message. The bearer modification request message is an example and may be referred to as another message.

Further, the MME may include security related information for ciphering and integrity protection of transmitted messages or information related to the low latency service data to transmit in the idle state in the data transfer request message and transmit the data transfer request message to the eNB (S2120).

The security related information may include ciphering algorithm supported by the UE, integrity guarantee algorithm supported by the UE, and/or a basic key (e.g., $K_{eNB}$) for generating keys for guaranteeing integrity and ciphering in the AS Security procedure of FIG. 10.

Information related to the low latency service data may include an EPS bearer ID for distinguishing a path for transmitting the low latency service data, a QoS representing a characteristic of the low latency service data, a size of the low latency service data, an address of a gateway to transmit the low latency service data, and/or a tunnel ID (e.g., GTP-TEID) representing a tunnel for transmitting the low latency service data to the eNB.

As described above, the MME may determine a tunnel ID for transmitting and receiving the low latency service data, i.e., for transmitting and receiving downward link data to notify the gateway and the eNB of this, the eNB may determine a tunnel ID to transmit the tunnel ID to the MME through the step (S2114), and the MME may transmit the tunnel ID to the gateway.

In this case, when ciphering algorithm and algorithm for guaranteeing integrity are selected by the foregoing predetermined method, the eNB may receive algorithm for guaranteeing ciphering and integrity supported by the UE from the MME and thus it may be known algorithm in which the UE uses for guaranteeing ciphering and integrity.

Thereafter, the MME may receive a bearer modification response message in response to the bearer modification request message from the gateway (S2122), and the eNB may receive the data from the gateway (S2124). In this case, the bearer modification response message is an example and may be referred to as another message.

The eNB, having received data from the gateway includes a data IE field including the data for providing a low latency service and an EPS bearer ID corresponding to the data in a transfer message (or RRC Direct DL Data Transfer message) to transmit the transfer message (or RRC Direct DL Data Transfer message) to the UE (S2126).

The transfer message is ciphered and integrity-protected by the eNB. That is, a PDCP layer of the eNB performs integrity protection of the transfer message using integrity protection algorithm determined at the step (S2112).

In this case, an input field of the integrity protection algorithm may be a count (e.g., Hyper frame number+PDCP sequence number), a direction representing a transmitting direction of the low latency service data, a bearer ID for distinguishing a transmitting path of the low latency service data, and the transfer message and a key for integrity protection in the AS Security procedure of FIG. 10.

A Message Authentication Code for Integrity (MAC-I) output as an execution result of the integrity protection algorithm passes through a ciphering process together with the transfer message.

The ciphering process is performed using ciphering algorithm determined at the step (S2112). An input field of the ciphering algorithm may be a count (e.g., Hyper frame Number+PDCP sequence number), a direction representing a transmitting direction of the low latency service data, a bearer ID for distinguishing a transmitting path of the low latency service data, and a length of key stream and a key for ciphering in the AS Security procedure of FIG. 10.

The transfer message and the authentication code may be masked (XOR operation) by ciphering key stream output as a result of the ciphering algorithm to be ciphered.

Thereafter, a PDCP layer of the UE adds a PDCP header including a security type representing whether security of the transfer message is applied to the transfer message.

The security type may represent one of not security protected representing that security was not applied, Integrity Protected representing that only integrity protection is applied, and Integrity protected and ciphered representing that both integrity protection and ciphering are applied according to applied security.

The UE, having received the transfer message decodes the transfer message and tests whether integrity.

As a test result, when the transfer message, having transmitted from the eNB is not changed or damaged, the UE may transmit a transfer result message (or RRC Direct DL data transfer result message) to the eNB and notify that the data have been successfully transmitted (S2128).

The eNB, having received the transfer result message may transmit a data transfer response message (or MME Direct Data transfer response message) to the MME and notify a transfer result of the data (S2130), and transmit a complete message (or RRC Direct Data Transfer Complete message) to the UE to notify the UE that a data transmitting procedure has been complete (S2132).

In this case, a UE identifier (e.g. Temporary C-RNTI, C-RNTI) acquired at the steps (S2110, S2116) may be released by transmission and reception of the transfer result message or the complete message. In this case, a release time point may be a transmitting and receiving time point of the messages, a time point in which a previously defined effective period has elapsed, or a time point in which an explicitly included time within a corresponding message has elapsed.

The step (S2128) and the step (S2132) may be omitted.

Figure 22:
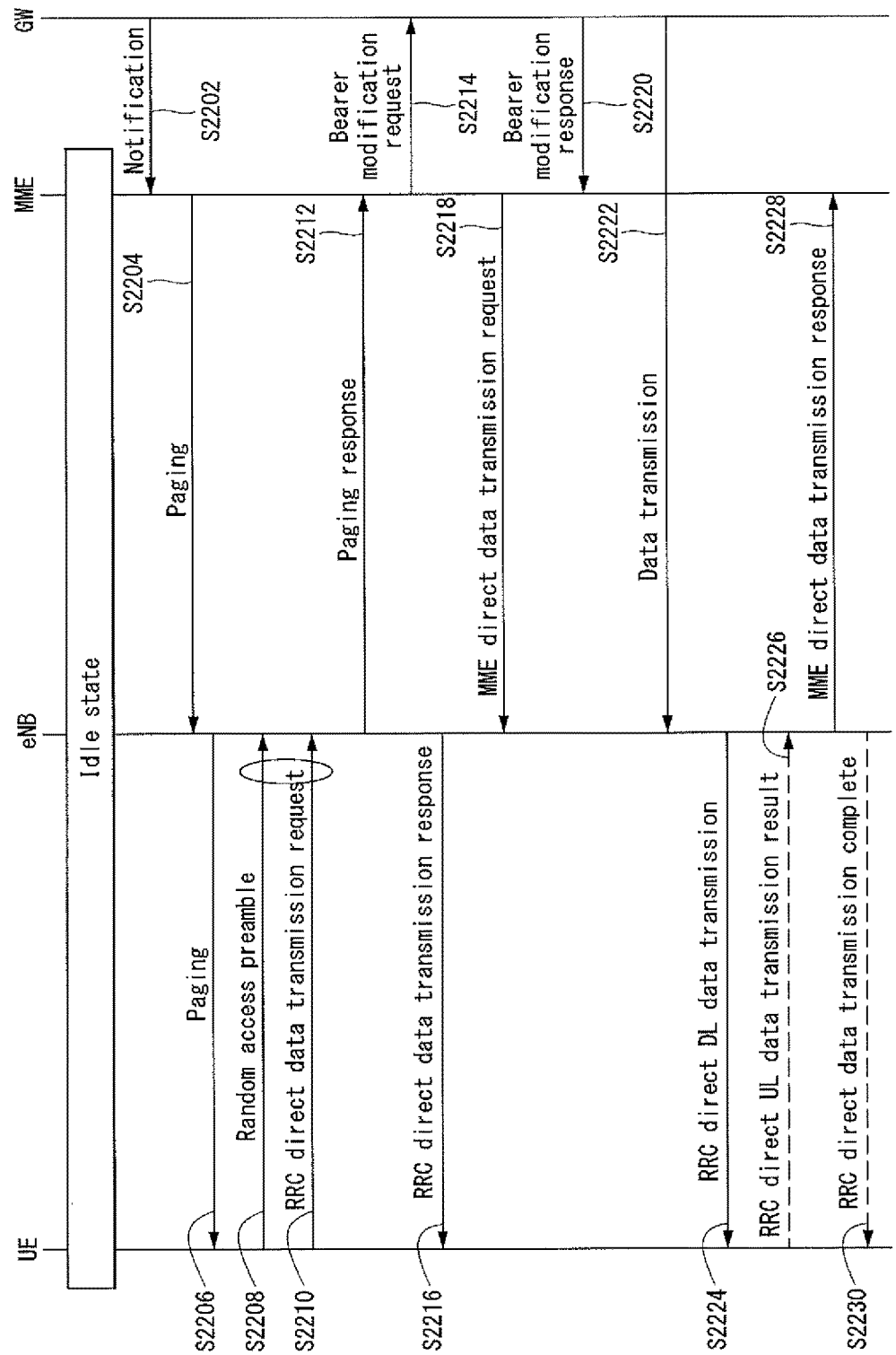
FIG. 22 is a flowchart illustrating another example of receiving data in an idle state to which the present invention may be applied.

FIG. 22 is a flowchart illustrating another example of receiving data in an idle state to which the present invention may be applied.

First, step (S2202) to step (S2206) are the same as step (S2102) to step (S2108) of FIG. 21 and therefore a description thereof will be omitted.

Thereafter, the UE may simultaneously transmit a random access preamble (S2008) that transmits in order to perform a random access procedure for allocating an uplink resource and DL data transmitted from the gateway, i.e., a request message (or RRC direct data transfer request message) for receiving low latency service data (S2210).

The request message may be the same message as a request message transmitted at step (S2112) of FIG. 21.

Hereinafter, step (S2212) to step (S2230) are the same as step (S2114) to step (S2132) of FIG. 21 and therefore a description thereof will be omitted.

In another exemplary embodiment of the present invention, in an uplink data transmitting and receiving process described with reference to FIGS. 17 to 20, downlink data may occur or additional uplink data may occur.

In this case, the UE may extend a release time point of a resource (e.g., Temporary C-RNTI) allocated to the UE through the eNB or the MME to transmit and receive downlink data or additional uplink data.

In another exemplary embodiment of the present invention, in a downlink data transmitting and receiving process described with reference to FIGS. 21 and 22, uplink data may occur or additional downlink data may occur.

In this case, the UE may extend a release time point of a resource (e.g., Temporary C-RNTI) allocated to the UE through the eNB or the MME to transmit and receive downlink data or additional uplink data.

Figure 23:
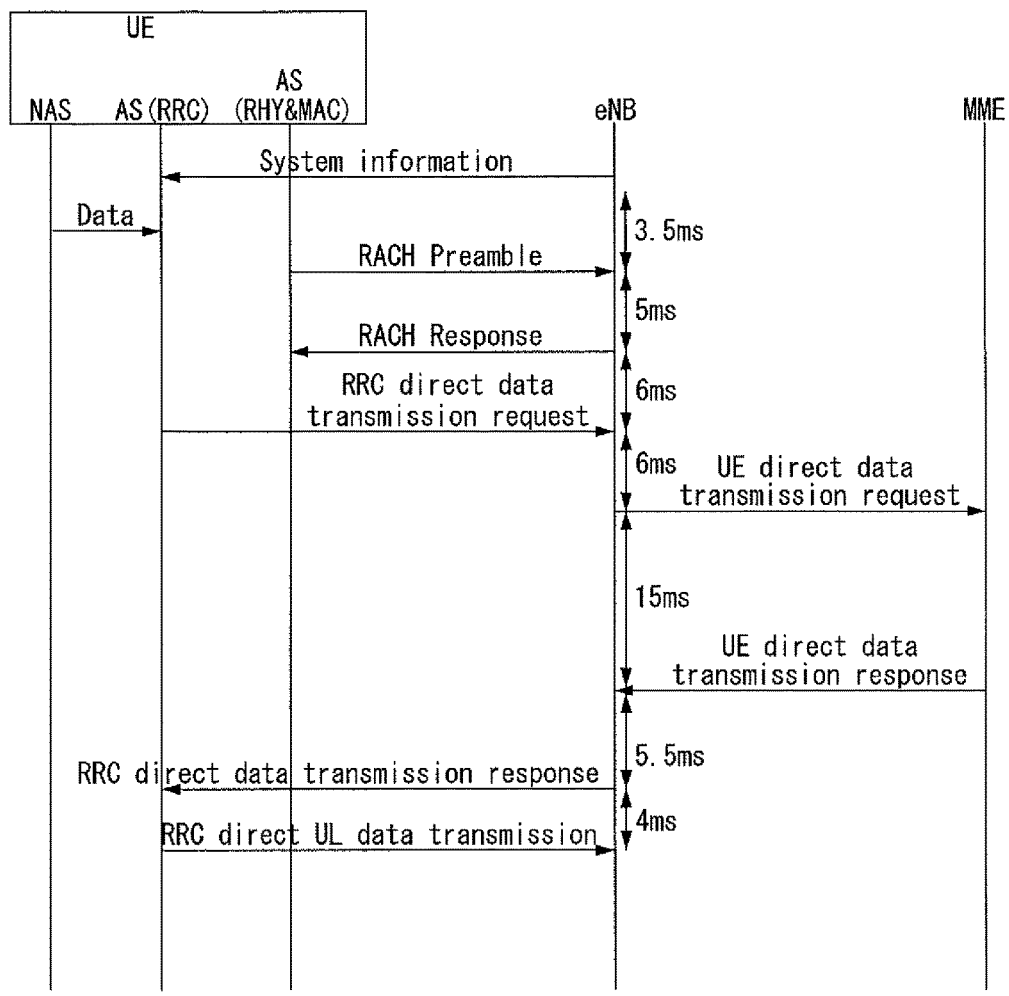
FIG. 23 is a flowchart illustrating an example of a time consumed when transmitting data for providing a low latency service in an idle state according to an exemplary embodiment of the present invention.

FIG. 23 is a flowchart illustrating an example of a time consumed when transmitting data for providing a low latency service in an idle state according to an exemplary embodiment of the present invention.

As shown in FIG. 23, when a UE transmits data for providing a low latency service after determining effectiveness (integrity) of the UE in an idle state using a method suggesting in the present invention, a time of 43 ms is consumed and thus a transmitting time can be shortened.

Table 4 compares an example of a consumed time when transmitting and receiving data for providing a low latency service in an idle state according to an exemplary embodiment of the present invention.

(TTI=1 ms, eNB scheduling delay=0, including no backhaul transmitting time)

TABLE 3

| Data transmitting and receiving method | Uplink data transmission consumption time |
| --- | --- |
| Conventional method | 94-102.5 ms |
| Suggested method | 43 ms |

As shown in Table 3, it may be determined that a data transmitting method for providing a low latency service through an exemplary embodiment of this specification may largely shorten a time for transmitting uplink data, compared with a data transmitting method after a change to an existing connection mode.

Through such a method, when performing uplink data transmission for providing a low latency service, by shortening a transmitting time, battery consumption of the UE can be reduced.

Further, by shortening an uplink data transmitting time, resource efficiency of a network can be increased.

Figure 24:
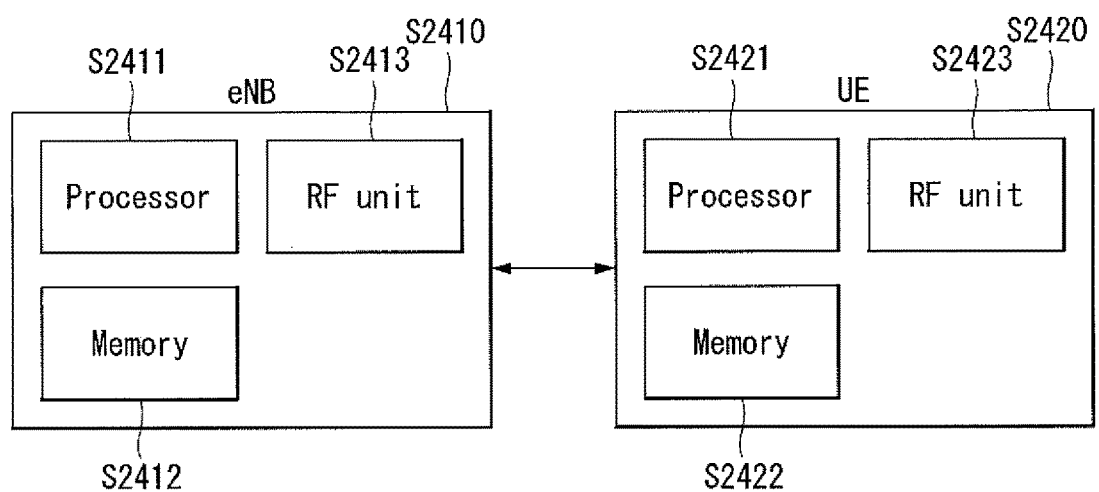
FIG. 24 is a block diagram illustrating an example of an internal configuration of a wireless apparatus to which the present invention may be applied.

FIG. 24 is a block diagram illustrating an example of an internal configuration of a wireless apparatus to which the present invention may be applied.

Here, the wireless apparatus may be an eNB and an UE, and the eNB includes both a macro eNB and a small eNB.

As shown in FIG. 24, an eNB 2410 and an UE 2420 include communication units (transmitting and receiving unit, RF unit) 2413 and 2423, processors 2411 and 2421, and memories 2412 and 2422, respectively.

In addition, the eNB and the UE may further include an input unit and an output unit.

In order to perform a method suggesting in this specification, the communication units 2413 and 2423, the processors 2411 and 2421, the input unit, the output unit, and the memories 2412 and 2422 are functionally connected, When receiving information generated in a Physical Layer Protocol (PHY Protocol), the communication units (transmitting and receiving unit or RF unit) 2413 and 2423 move the received information to a Radio-Frequency Spectrum (RF spectrum), perform filtering and amplification, and transmits the information to an antenna. Further, the communication units perform a function of moving and filtering a Radio Frequency Signal (RF signal) received in the antenna to a band that may process in the PHY protocol.

The communication unit may include a switch function for converting such a transmission and reception function.

The processors 2411 and 2421 implement a function, process, and/or method suggested in this specification. Layers of a wireless interface protocol may be implemented by the processor.

The processor may be represented with a control unit, a controller, and a computer.

The memories 2412 and 2422 are connected to the processor to store a protocol or a parameter for performing an uplink resource allocation method.

The processors 2411 and 2421 may include an application-specific integrated circuit (ASIC), another chipset, a logic circuit, and/or a data processor. The memory may include a read-only memory (ROM), a random access memory (RAM), a flash memory, a memory card, a storage medium, and/or another storage device. The communication unit may include a baseband circuit for processing a radio signal. When an exemplary embodiment is implemented with software, the above-described technique may be implemented with a module (process, function) that performs the above-described function.

The module may be stored at a memory and be executed by the processor. The memory may exist at the inside or the outside of the processor and may be connected to the processor with well-known various means.

The output unit (display unit) is controlled by the processor and outputs information output from the processor together with a key input signal generated in a key input unit and various information signals from the processor.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

In a wireless communication system of the present invention, an RRC connection method has been described in an example applied to a 3GPP LTE/LTE-A system, but may be applied to various wireless communication systems in addition to a 3GPP LTE/LTE-A system.

The invention claimed is:

1. A method for transmitting and receiving data in a wireless communication system supporting a low latency service, the method performed by a user equipment (UE) comprising:

receiving system information from a base station (BS), wherein the system information includes information for a security algorithm supported by the BS;

performing a random access procedure with the BS based on the system information;

transmitting, to the BS, a request message through a resource allocated by the random access procedure, wherein the request message includes (i) a TX indicator field used for informing the BS of a transmission or reception of low latency service data and (ii) a user equipment identifier Information Element (UE ID IE);

receiving, from the BS, a response message including resource allocation information related to a resource for transmission of the low latency service data, in response to the request message; and transmitting, to the BS, a transmission message based on the resource allocation information, wherein the transmission message is encrypted based on the information for the security algorithm, and wherein the method is performed in an idle state of the terminal UE.

2. The method of claim 1, wherein the system information further includes a support field indicating whether the BS supports transmission for the low latency service data of the UE in Drill the idle state.

3. The method of claim 1, wherein the information for security algorithm includes at least one of an encryption algorithm for encrypting the transmission message supported by the BS or an integrity algorithm for determining whether the transmission message is changed.

4. The method of claim 1, wherein the request message further includes a security information element (IE) for determining effectiveness of the UE and a Quality of Service Information Element (QoS IE) field indicating a characteristic of the data, based on the TX indicator field informing the BS of a transmission.

5. The method of claim 4, wherein the security IE includes at least one of i) a security header type field informing the BS whether the transmission message is encrypted or whether integrity protection is applied or ii) an authentication code for determining whether to change the low latency service data.

6. The method of claim 4, wherein the QoS IE is related to a characteristic of the low latency service data and includes at least one of an EPS (evolved packet system) Bearer ID (identifier) for identifying a session of the low latency service data or a data size field indicating a size of the data.

7. The method of claim 1, wherein the response message includes a target UE ID IE field informing the UE of a UE to which the resource is allocated.

8. A method for transmitting and receiving data in a wireless communication system supporting a low latency service, the method performed by a base station (BS) comprising:

transmitting, to a user equipment (UE), system information, wherein the system information includes information for a security algorithm supported by the BS;

performing a random access procedure with the UE based on the system information;

receiving, from the UE, a request message through a resource allocated by the random access procedure, wherein the request message includes (i) a TX indicator field used for informing the BS of a transmission or reception of low latency service data and (ii) a user equipment identifier Information Element (UE ID IE);

transmitting, to a Mobility Management Entity (MME), a data transfer request message based on the request message;
receiving, from the MME, at least one of security information or data information;
transmitting, to the UE, a response message including resource allocation information related to a resource for transmission of the low latency service data, in response to the request message,
wherein the resource allocation information is based on the data information; and
receiving, from the UE, a transmission message based on the resource allocation information,
wherein the transmission message is encrypted based on the information for the security algorithm, and
wherein the method is performed in an idle state of the UE.

9. The method of claim 8, wherein the system information further includes a support field indicating whether the BS supports reception for the low latency service data of the UE in Drill the idle state of the UE.

10. The method of claim 8, wherein the information for the security algorithm includes at least one of an encryption algorithm for encrypting the transmission message supported by the BS or an integrity algorithm for determining whether of the transmission message is changed.

11. The method of claim 8, wherein the request message further includes a security information element for determining effectiveness of the UE and a Quality of Service Information Element (QoS IE) field indicating a characteristic of the data.

12. The method of claim 11, wherein the security information element includes at least one of i) a security header type field informing the UE whether the low latency service data is encrypted or whether integrity protection based on a change of the low latency service data is applied or ii) an authentication code for determining whether to change the low latency service data.

13. The method of claim 8, wherein the response message includes a target UE ID IE field informing the UE of a UE to which the resource is allocated.

14. A user equipment (UE) for transmitting and receiving data in a wireless communication system supporting a low latency service, the UE comprising:
a transceiver that transmits and receives a radio signal; and
a processor functionally connected to the transceiver,
wherein the processor controls to,
receive system information from a base station (BS),
perform a random access procedure with the BS based on the system information, wherein the system information includes information for a security algorithm supported by the BS,
transmit a request message to the BS through a resource allocated by the random access procedure, wherein the request message includes (i) a TX indicator field used for informing the BS of a transmission or reception of low latency service data and (ii) a user equipment identifier Information Element (UE ID IE),
receive a response message including resource allocation information related to a resource for transmission of the low latency service data in response to the request message, and
transmit a transmission message based on the resource allocation information to the base station,
wherein the transmission message is encrypted based on the information for the security algorithm, and
wherein the UE operates in an idle state.

15. A base station (BS) for transmitting and receiving data in a wireless communication system supporting a low latency service, the BS comprising:
a transceiver that transmits and receives a radio signal; and
a processor functionally connected to the transceiver,
wherein the processor controls to,
transmit system information to a user equipment (UE), wherein the system information includes information for a security algorithm supported by the BS,
perform a random access procedure with the UE based on the system information,
receive a request message from the UE through a resource allocated by the random access procedure, wherein the request message includes (i) a TX indicator field used for informing the BS of a transmission or reception of low latency service data and (ii) an user equipment identifier Information Element (UE ID IE),
transmit, to a Mobility Management Entity (MME), a data transfer request message based on the request message;
receive, from the MME, at least one of security information or data information;
transmit a response message including resource allocation information related to a resource for transmission of the low latency service data in response to the request message, wherein the resource allocation information is based on the data information, and
receive a transmission message based on the resource allocation information,
wherein a Quality of Service Information Element (QoS IE) is related to a characteristic of the low latency service data,
wherein the transmission message is encrypted based on the information for the security algorithm, and
wherein the UE operates in an idle state.

16. The method of claim 1, wherein the transmission message includes the low latency service data and Evolved Packet system (EPS) bearer ID related to the low latency service data.

* * * * *